US012560897B2

(12) United States Patent
Taheri et al.

(10) Patent No.: US 12,560,897 B2
(45) Date of Patent: Feb. 24, 2026

(54) ESTIMATING ENERGY CONSUMPTION FOR A BUILDING USING DILATED CONVOLUTIONAL NEURAL NETWORKS

(71) Applicant: Arbnco Ltd, Glasgow (GB)

(72) Inventors: Mahnameh Taheri, Glasgow (GB); Colin Parry, Glasgow (GB); Alan Wegienka, Glasgow (GB)

(73) Assignee: Arbnco Ltd, Glasgow (GB)

( * ) Notice: Subject to any disclaimer, the term of this patent is extended or adjusted under 35 U.S.C. 154(b) by 248 days.

(21) Appl. No.: 18/043,023

(22) PCT Filed: Aug. 25, 2021

(86) PCT No.: PCT/EP2021/073545
§ 371 (c)(1),
(2) Date: Feb. 25, 2023

(87) PCT Pub. No.: WO2022/043403
PCT Pub. Date: Mar. 3, 2022

(65) Prior Publication Data
US 2023/0324860 A1 Oct. 12, 2023

(30) Foreign Application Priority Data
Aug. 26, 2020 (GB) ...................................... 2013378

(51) Int. Cl.
*G05B 15/02* (2006.01)
*H02J 13/00* (2006.01)
(52) U.S. Cl.
CPC ........ *G05B 15/02* (2013.01); *H02J 13/00002* (2020.01)
(58) Field of Classification Search
CPC .................................................... Y02B 20/40
See application file for complete search history.

(56) References Cited

U.S. PATENT DOCUMENTS 10,460,274 B2 10/2019 He
2013/0085614 A1* 4/2013 Wenzel .................... F24F 11/58
700/277

(Continued)

FOREIGN PATENT DOCUMENTS

CA 3066534 A1 * 4/2019 ............. G06F 18/24
CA 3064226 A1 * 1/2020 ............. G06N 3/02
KR 101762543 B1 * 7/2017

OTHER PUBLICATIONS

Cillian Brewitt et al, "Non-Intrusive Load Monitoring with Fully Convolutional Networks", arxiv.org, Cornell University Library, 201 Olin Library Cornell University Ithaca, NY 14853, (Dec. 10, 2018), XP080991246.

(Continued)

*Primary Examiner* — Suresh Suryawanshi
(74) *Attorney, Agent, or Firm* — SLEMAN & LUND LLP

(57) ABSTRACT

Systems and methods for estimating energy consumption data for a building. A system for estimating an energy use of a building uses a dilated convolutional neural network architecture to receive time-series data for the building and to predict one or more time-series data points representing an estimated energy consumption for the building. A method for estimating an energy use of a building includes obtaining time-series data for the building, providing the time-series data as input to a dilated convolutional neural network architecture, and predicting one or more time-series data points representing an estimated energy consumption for the building using the dilated convolutional neural network architecture. The systems and methods may be used to help users and building controllers reduce energy use within a building.

15 Claims, 9 Drawing Sheets

(56) References Cited

U.S. PATENT DOCUMENTS

| | | | | |
|---|---|---|---|---|
| 2014/0142904 | A1* | 5/2014 | Drees | G06Q 10/04 |
| | | | | 703/2 |
| 2019/0302157 | A1* | 10/2019 | Vitullo | G01K 17/20 |
| 2019/0347577 | A1 | 11/2019 | Ba | |
| 2019/0378020 | A1* | 12/2019 | Camilus | G05B 19/042 |
| 2020/0159723 | A1* | 5/2020 | Goyal | G05B 15/02 |
| 2020/0160847 | A1* | 5/2020 | Coucke | G10L 15/16 |
| 2020/0258627 | A1* | 8/2020 | Setegn | G16H 80/00 |

OTHER PUBLICATIONS

Martins, Pedro BM, et al. "Application of a deep learning generative model to load disaggregation for industrial machinery power consumption monitoring." 2018 IEEE international conference on communications, control, and computing technologies for smart grids (SmartGridComm). IEEE, 2018.

Rahman, Imran, Murat Kuzlu, and Saifur Rahman. "Power disaggregation of combined HVAC loads using supervised machine learning algorithms." Energy and Buildings 172 (2018): 57-66.

Taheri, Mahnameh, et al. "Benchmarking Building Energy Consumption Using Efficiency Factors." Building Simulation Conference Proceedings, IBPSA. 2019.

Yang Yandong et al., "Semisupervised Multilabel Deep Learning Based Nonintrusive Load Monitoring in Smart Grids", IEEE Transactions on Industrial Informatics, IEEE Service Center, New York, NY, US, vol. 16, No. 11, doi:10.1109/TII.2019.2955470, ISSN 1551-3203, (Nov. 25, 2019), pp. 6892-6902, (Jul. 31, 2020), XP011801965.

* cited by examiner

1300

1302

Obtain Time-Series Data for Building

1304

Provide Data as Input to DCNN

1306

Predict Energy Consumption

1308

Compare Measured Energy Consumption Data to Predicted Energy Consumption Data

1310

Output Indication of Difference

1400

1430

Processor

1420

Instructions

1410

ESTIMATING ENERGY CONSUMPTION FOR A BUILDING USING DILATED CONVOLUTIONAL NEURAL NETWORKS

FIELD OF THE INVENTION

The present invention relates to systems and methods for estimating the energy consumption of a building. The present invention may be used to improve an energy efficiency of a building, such as a large non-residential building, by allowing a comparison of predicted and measured energy consumption data. The present invention may be seen to reside in the field of energy systems engineering.

BACKGROUND OF THE INVENTION

Reducing energy use is a pressing problem for the modern world. Scientific studies show ongoing changes in the global climate. These include rising land and ocean temperatures. The studies indicate that human activity is the leading cause of these changes, in particular the emission of so-called "greenhouse" gases. There is evidence that buildings are a major source of greenhouse gas emissions. For example, buildings are respectively responsible for 46% and 40% of all $CO2$ emissions in the United Kingdom and United States. In order to address the problem of climate change, energy systems engineers are tasked with developing solutions to reduce building energy consumption and increase building energy efficiency. Solutions are desired that may be applied to both new and existing buildings, e.g. that improve energy efficiency when constructing and retrofitting buildings.

One problem with reducing energy consumption is it is difficult to know where to begin. Through individual studies, energy systems engineers have identified large non-residential properties as being relatively large consumers of energy. Commercial buildings, such as offices, public buildings and retail outlets, use a lot of power but are difficult to analyse. For example, they often have multiple units with varying tenants and occupants, as well as industrial lighting, heating and air circulation systems.

One area of energy systems engineering that is beginning to gain traction in both the home and the workplace is energy load measurement. For example, so-called "smart meters" have seen wide adoption in many buildings. Although specifics vary, energy load sensor systems are fairly easy to install, typically being passively attached to energy conduits that enter the building (such as electricity cables and gas pipelines). Their roll-out has also often been managed and subsidised by utility companies, as they require gross figures of use for accurate billing. However, one problem with this form of energy load measurement is that it tends to only provide a single gross level of energy consumption, such as a number of kilo Watt-hours (e.g., for gas and/or electricity) over time. While suitable for billing purposes, these measurements are difficult for energy systems engineers to use to reduce energy consumption. For example, it is often very difficult to distinguish casual factors for energy reduction from the raw data. Despite many smart meters displaying the gross levels of energy consumption, this has not yet translated into widespread action to make buildings more environmentally friendly.

Within the field of energy systems engineering, research teams are beginning to investigate the application of machine learning systems to energy data. A number of projects have attempted to use machine learning systems to forecast future load demand for utility companies over large regional areas, especially those with variable renewable energy sources.

Sholeh Hadi Pramonon et al., in their paper "Deep Learning-Based Short-Term Load Forecasting for Supporting Demand Response Program in Hybrid Energy System", published on 30 Aug. 2019 in Energies (issue 12, 3359), describe the use of a model that employs a dilated causal residual convolutional neural network (CNN) followed by a long short-term memory (LSTM) to forecast future load demand for utilities that provide renewable energy over large areas (e.g. continents and/or states). The model allows utilities to determine whether electrical power generated by a set of renewable energy sources is forecast to meet future demand. They use datasets from the European Network of Transmission System Operators for Electricity (ENTSOE) and the Independent System Operator of New England (ISO-NE) that contain time-series energy load data for Europe and New England (in the United States of America).

Sajjad Khan et al., in their paper "Electricity Load Forecasting for Each Day of Week Using Deep CNN" published in March 2019 in Advances in Intelligent Systems and Computing (pp. 1107-1119), describe how deep convolutional neural networks (CNNs) may be used to forecast the electricity load for each day of the week for Victoria (Australia). The authors suggest these systems may be useful in demand-side power management.

However, these research projects seek to predict large-scale energy patterns over large geographical areas. They are not applied for use in reducing the energy consumption of residential and commercial buildings.

It is thus desired to provide methods and systems that help building users and controllers reduce the energy consumption of buildings, including public buildings and building complexes. It is further desired to provide a system that does not require the knowledge of expert energy systems engineers and that allows building controllers to identify casual changes in energy use without the continued oversight of a highly-skilled engineer.

SUMMARY OF THE INVENTION

Aspects of the present invention are set out in the appended independent claims. Variations of these aspects are set out in the dependent claims.

Further features and advantages of the invention will become apparent from the following description, which is made with reference to the accompanying drawings.

DETAILED DESCRIPTION OF THE INVENTION

Figure 1:
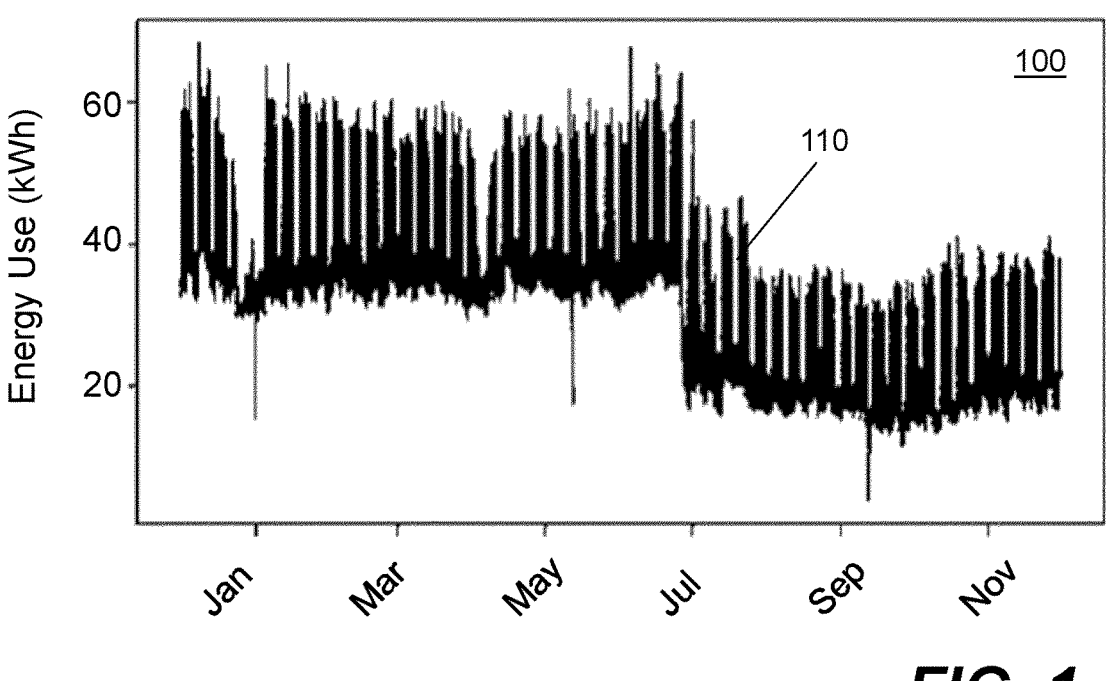
FIG. 1 is a chart showing an example set of energy load data.

Certain examples described herein relate to systems and methods for estimating the energy consumption of a building. In the examples, a dilated convolutional neural network architecture is used to predict one or more time-series data points representing the energy consumption of the building. For example, certain implementations may predict future energy load data, i.e. data that indicates an amount of energy that is used by a building—the energy "load" of the building. The dilated convolutional neural network architecture may thus be used to predict future readings for a smart meter, whether used within the building or accessed remotely. For example, energy load data from a smart meter may be provided as time-series data wherein one or more energy consumption values at different points in time are measured; in this case, the dilated convolutional neural network architecture is configured to predict energy consumption values for subsequent points in time, e.g. in the form of a virtual measurement.

In examples, energy consumption may be measured and predicted for a number of different energy sources, including electricity, gas and liquid or solid fuel sources. In certain cases, electrical power or gas consumption may be recorded at predefined time intervals (e.g., every minute, every defined fraction of an hour or hourly) by sensor devices that are mounted within or upon energy conduits that feed the building, such as gas pipelines or electrical power lines. Time-series data may be represented as an n-dimensional array of data, where n is equal to the number of properties being measured. The dilated convolutional neural network architecture may be trained online using measured data values and then used to predict future data values. This then allows future planning and comparison with future measured values. For example, a change or modification may be made to the building such as modifying heating and cooling cycles, adding insulation, and/or upgrading equipment. The present systems and methods allow predictions based on data obtained before the change to be compared to actual measurements of energy consumption after the change, and thus allow causal reductions to be identified (e.g., to determine whether the change reduced the measured energy consumption as compared to the prediction, validating the change). Similarly, if predictions and actual measurements are compared and there is no identifiable difference, then this may suggest that the change is ineffective or needs further investigation. Predictions may also be used to highlight potential future increases in energy consumption that may be controlled or mitigated through changes in building use and/or control. In this manner, building controllers are provided with tools to help reduce the energy consumption of buildings and address pressing environmental issues.

Through experiment and prototype implementations, the present inventors have identified that a dilated convolutional neural network architecture allows for energy consumption of a building to be accurately predicted, e.g. following training on historical or past data associated with the building. The convolutional neural network is an efficient neural network implementation that applies one or more local filters to input data. A dilated convolutional neural network architecture expands on a conventional neural network by growing a receptive field across multiple convolution layers. This allows temporal patterns at different scales to be accurately modelled. This approach has been found to work well with the type of patterns that are to be found in energy consumption data, such as smart meter measurements in kilo-Watt hours. This is because energy consumption within a building is determined based on multiple cyclical processes operating over different time scales; for example, daily occupational patterns, day of the week use patterns, monthly use patterns, seasonal use patterns, seasonal weather patterns and the like. Different buildings have different patterns at different levels. By training a dilated convolutional neural network architecture based on time-series data for the building (e.g. past measurements), then an accurate representation of the specific characteristics of the building may be captured within the parameter values of the neural network architecture.

Certain examples described herein present variations that may improve prediction for particular use cases and particular buildings. These include architecture components that may be used, as well as methods of training the dilated convolutional neural network architecture. In certain cases, the examples described herein may be incorporated into a local and/or remote "smart meter" for a building. This modified smart meter is then able to display predicted as well as actual energy consumption values for use in reducing energy consumption.

Approaches discussed in the examples below may be used as a replacement for certain comparative building performance simulation (BPS) systems. Comparative BPS systems are often based on explicit physical modelling of the building, e.g. using the laws of physics, finite element methods and the like, and may take minutes or hours to simulate energy consumption based on a set of input building properties. In contrast, prediction (also referred to as inference or estimation) using the described systems may be performed in seconds providing orders of magnitude improvements. This then provides scope for the inclusion of energy consumption predictions in real-time or near real-time modelling tools for reducing energy consumption. The dilated convolutional neural network architectures described herein are able to model complex non-linear relationships via the use of one or more hidden or latent convolution layers between input and output layers. Hence, examples described herein also provide improvements over linear estimation tools and can accurately model many more of the real-world non-linear patterns that are to be found within measured building data.

While the present examples may be applied in both residential and non-residential buildings (e.g., homes and workplaces), they are particularly useful in the second case.

This is because non-residential buildings such as shops, offices, factories and public buildings typically consist of units that have a much larger floorspace area than residential buildings, have a greater variety of electrical equipment (including industrial equipment) and are occupied at different times by a larger number of people. This means that many different energy consumption patterns are often present, which are reflected in complex non-linear temporal patterns in measured energy consumption data.

FIG. 1 shows an example of energy load data 100 for a year for an office. In the present examples, the phrases "energy load" and "energy consumption" may be taken as synonyms. The energy load data in FIG. 1 comprises a series of energy use values 110 (plotted as y-axis values) over time (where time is plotted along the x-axis). For example, a reading may be taken from an electricity and/or gas meter every hour, with energy use here being measured in kilo Watt-hours (kWh). It is this energy load data similar to this that is estimated in the examples described below.

Figure 2:
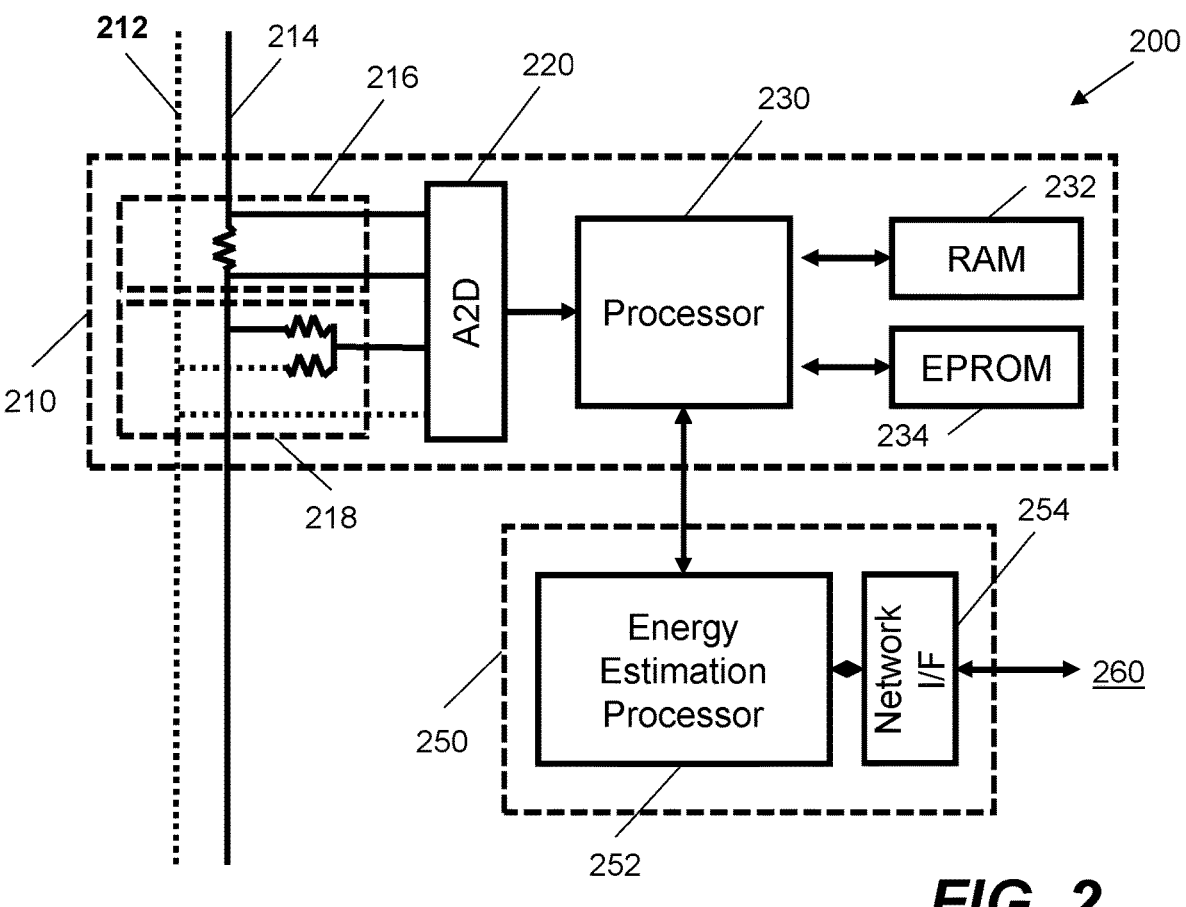
FIG. 2 is a schematic diagram showing an example smart meter and energy estimation system.
Figure 3:
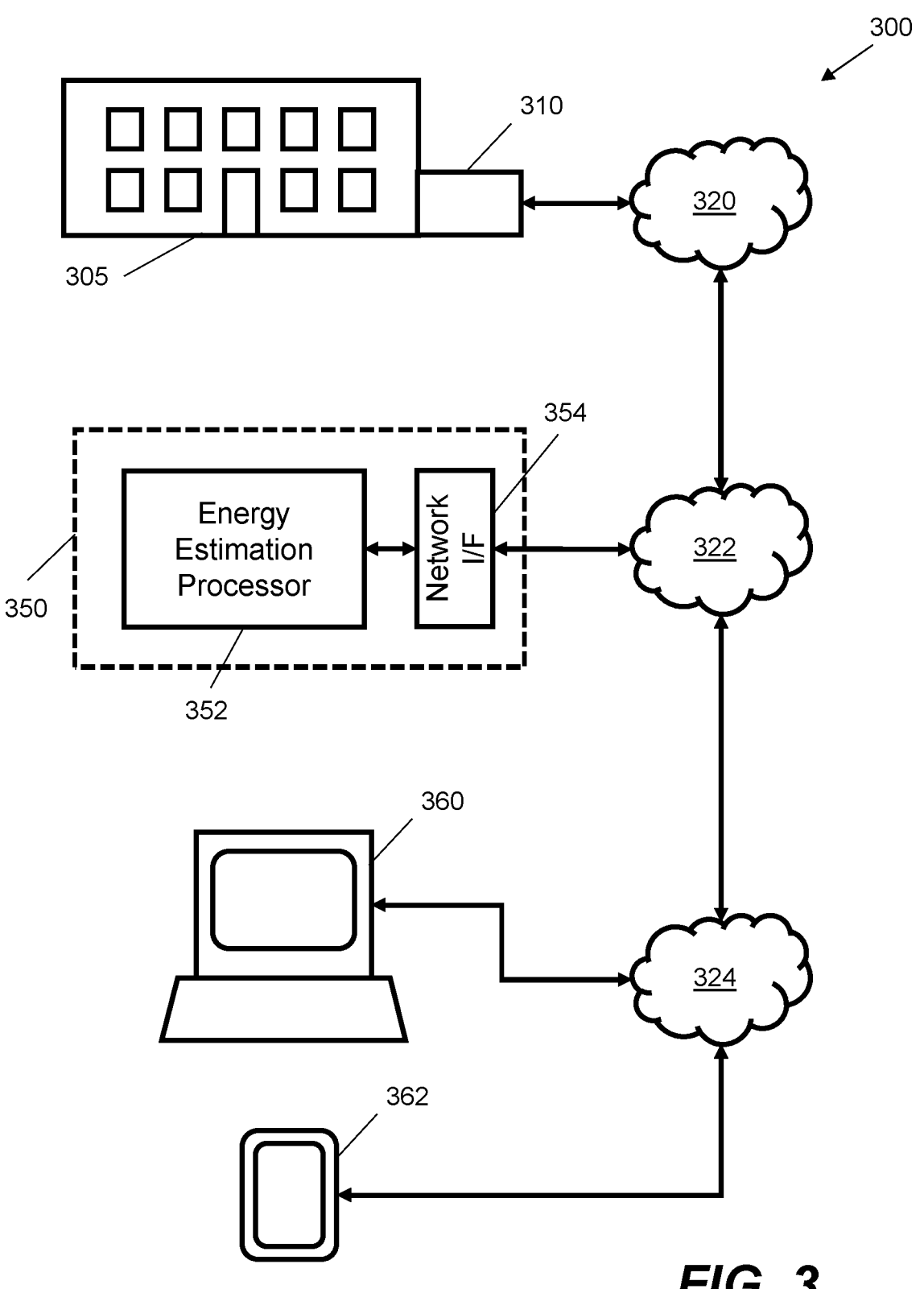
FIG. 3 is a schematic diagram showing networked components of an example energy estimation system for a building.

FIGS. 2 and 3 show two example contexts for an energy estimation system, as set out in later examples. FIG. 2 shows how an example energy estimation system may be incorporated into a smart meter that is locally installed within a building. FIG. 3 shows an example energy estimation system that is located remotely (e.g., in relation to the building). Both contexts may be seen as alternatives and/or complementarily, e.g. in the latter case, a distributed energy estimation system may have both local and remote processing components.

The example 200 of FIG. 2 shows an energy measurement device 210 and an energy estimation system 250. The energy measurement device 210 in this example is configured to measure electricity use, but other non-illustrated examples may measure liquid and/or gaseous fuel flow or other measures of energy consumption. The energy measurement device 210 in the present example is coupled to a neutral line 212 and a live line 214. Although this example shows an active coupling to these electricity lines (212 and 214), other measurement sensors may use a passive coupling, e.g. using electromagnetic approaches and passively induced fields and/or currents. The energy measurement device 210 comprises a current sensor 216 and a voltage sensor 218 that provide analogue measurement readings to an analogue-to-digital (A2D) converter 220. The A2D convertor 220 then digitalises the sensor readings (e.g., outputs an 8 or 16-bit reading) and provides this to a measurement processor 230. The measurement processor 230 is electronically coupled to a volatile random-access memory (RAM) 232 and a non-volatile erasable programmable read-only memory (EPROM) 234. Firmware stored in the EPROM 234 may be loaded into RAM 232 in operation and be executed by the measurement processor 230. Computer program instructions that are executed by the measurement processor 230 are configured to compute energy load data for output, e.g. in the form shown in FIG. 1. The energy measurement device 210 may thus be seen as a form of embedded computer. It should be noted that many different configurations are possible, and FIG. 2 is provided as an example to illustrate one approach to obtain energy load data.

In the example 200 of FIG. 2, the measurement processor 230 is communicatively coupled to an energy estimation processor 252 that forms part of the energy estimation system 250. The energy estimation system 250 also comprises a network interface 254 that is communicatively coupled to the energy estimation processor 252 (e.g., may be coupled via a systems bus). The network interface may comprise a known wired and/or wireless interface (such as a wired Ethernet interface or a wireless ZigBee®, Bluetooth® or Wi-Fi® interface). The network interface 254 may be used to communicate over a network 260. In FIG. 2, the energy estimation system 250 is shown as a separate sub-system and may be implemented as a configurable "upgrade" to a pre-existing smart meter that comprises the energy measurement device 210. In certain cases, e.g. for newer devices, the energy estimation system 250 may be included as part of the energy measurement device 210, e.g. the measurement processor 230 may be adapted to perform the functions of the energy estimation processor 252.

In use, the measurement processor 230 is configured (e.g., via processing of firmware loaded into the RAM 232) to compute an energy consumption value based on the digitalised measurements from the current sensor 216 and the voltage sensor 218. The measurement processor 230 may be configured to poll the A2D converter 220 at regular, or otherwise determined, time intervals and obtain digital data values for measured current and voltage that may then be multiplied to obtain a power measurement. The power measurement may then be integrated or otherwise summed over the period of measurement to determine an energy consumption value in Watt-hours or kilo Watt-hours. The energy consumption value is then provided to the energy estimation processor 252 as energy load data, such as that shown in FIG. 1. In examples, different pre- and post-processing functions may be applied as necessary to generate energy load data in a desired format. The precise computations for the raw energy load data obtained by the energy estimation processor 252 do not form the focus of the present examples.

FIG. 3 shows an arrangement 300 that may be used for remote monitoring and prediction of energy consumption for a building 305. In the example of FIG. 3, the building 305 comprises a building services unit 310 that is communicatively coupled to a series of computer networks 320, 322 and 324. The building services unit 310 may comprise an energy measurement device such as device 210 in FIG. 2, wherein the energy measurement device comprises a network interface to couple it to the network 320 (e.g., similar to the network interface 254). In the example of FIG. 3, an energy estimation system 350 similar to the energy estimation system 250 of FIG. 2 is provided, but in this example the energy estimation system 350 is remote from the building 305 and the building services unit 310. The energy estimation system 350 comprises an energy estimation processor 352 and a network interface 354 as per the example of FIG. 2; however, in this case, the network interface 354 is communicatively coupled to network 322. The network interface 354 thus receives energy load data from the building services unit 310 via networks 320 and 322. Depending on the configuration the energy estimation system 350 may receive data continuously (e.g., every minute, 15-minutes or hour) or in batches (e.g., every day or every week). Either approach, or a combination of approaches, may be used.

In FIG. 3, the energy estimation system 350 is further communicatively coupled to a third computer network 324 that allows communication with one or more computing devices. In FIG. 3, a desktop computing device 360 and a mobile computing device 362 (such as a tablet or smartphone) are shown. The desktop computing device 360 and the mobile computing device 362 communicate with the energy estimation system 350 to obtain energy load data, e.g. for visualisation using a display of either device. This may comprise a combination of one or more of measured and predicted energy load data as described with reference to the examples below. In one case, a similar approach may also be used to communicate with the energy estimation system 250 of FIG. 2. In yet another case, the energy estimation system 250 of FIG. 2 may be coupled to a local display device for visualisation of the output of the energy estimation system 250. Those skilled in the art will appreciate that many different configurations of local, remote and distributed devices are possible, with many variations to those described in FIGS. 2 and 3, and the examples described below may be applied in multiple different circumstances.

Figure 4:
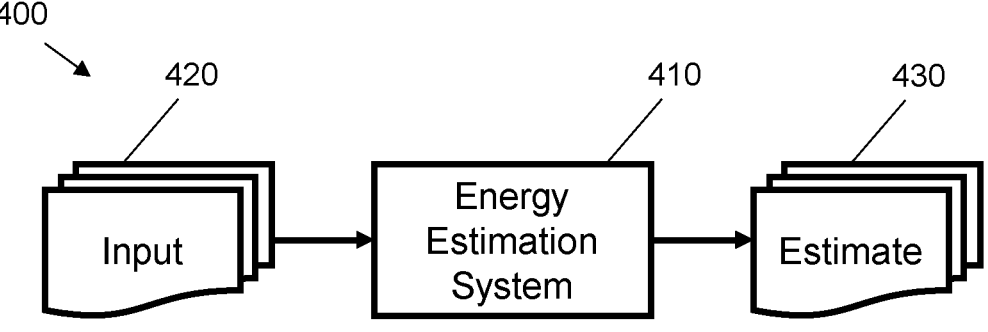
FIG. 4 is a schematic diagram showing an example energy estimation system for a building.

FIG. 4 shows an example 400 of an energy estimation system 410. This energy estimation system 410 may implement the energy estimation system 250 of FIG. 2 and/or the energy estimation system 350 of FIG. 3. The energy disaggregation system 410 may be implemented using a processor, such as one of the energy estimation processors 252 or 352 of FIGS. 2 and 3, e.g. by executing instructions loaded from storage. The energy estimation system 410 receives time-series data 420 for a building as input. The building may be the building 300 of FIG. 3. The time-series data 420 may be received sample-by-sample over time, in mini-batches, or in one large batch. The time-series data 420 comprises a set of time samples that represent measurements associated with the building at successive points in time. The time-series data 420 may comprise one or more data values per sample. In certain cases, different forms of time-series data may be provided as different vector elements of a time sample. In certain cases, the time-series data 420 may be pre-processed. For example, scaling and/or normalisation of input data values may be performed. In one case, values may be normalised by subtracting a mean and dividing by a standard deviation. The mean and the standard deviation may be determined based on batches and/or mini-batches of samples. Pre-processing may ensure that input columns have a similar magnitude for easier convergence during training of the energy estimation system 410.

In the example 400 of FIG. 4, the energy estimation system 410 employs a dilated convolutional neural network architecture to generate estimated energy consumption values for the building. In FIG. 4, the energy estimation system 410 outputs one or more time-series data points 430 representing the estimated energy consumption. For example, the estimated energy consumption 430 may comprise virtual energy consumption values for points in time that follow the time period covered by the input time-series data 420. The input time-series data 420 may comprise a windowed portion of time preceding a time for an estimate.

The one or more time-series data points 430 may comprise a set of data points at the same sampling frequency as the input time-series data 420. For example, the dilated convolutional neural network architecture may be configured to receive time-series data 420 with a predefined sampling frequency and an output of the dilated convolutional neural network architecture may be provided at the same sampling frequency. The sampling frequency may depend on the available data source (e.g. the energy measurement device 210 of FIG. 2). Typical sampling frequencies include frequencies of at least one sample every hour (hourly), with higher resolution data sources providing sampling frequencies of every half-hour or quarter-hour. The nature of the dilated convolutional neural network architecture is such that the input time-series data 420 may be different for different buildings, and may have a very high-resolution sampling frequency (e.g. samples every minute), yet still be able to capture different temporal patterns within the data, e.g. following a training operation. In one case, the number of convolution layers within the dilated convolutional neural network architecture may be set based on the sampling frequency of the input time-series data 420 for a particular building.

In one example, the dilated convolutional neural network architecture is configured to receive time-series data for the building comprising weather data. The weather data may comprise one or more of temperature (e.g., external temperature), humidity, wind properties (e.g., wind speed and/or direction) and solar irradiance. The weather data may be at a desired sampling frequency (e.g., the sampling frequency of energy consumption values measured by a smart meter or the like) or may be resampled to match the desired sampling frequency. The weather data may be measured by one or more sensor devices located on, at or near the building, and/or may comprise measured data for a location containing the building that is provided by an application programming interface (API) in a similar network configuration to that shown in FIG. 3. Hence, weather data may comprise direct data from building sensors and/or retrieved data from a data source representing other measurements of weather conditions within the environment of the building. In one case, weather data may be retrieved (e.g., from a third-party source) using a network query using the location of the building as a parameter (e.g., the post or zip code of the building). In certain cases, the weather data may be weather forecast data, e.g. from meteorological office or other forecast source. In certain cases, the weather data may be generated synthetically using an output of a climate model. In general, the weather data typically represents local weather conditions for the building, e.g. conditions for a location that includes or is near to the building. The weather data may be provided based on data for a nearby weather station, and in certain cases, the weather station may be a distance (e.g., a kilometres) from the building. In certain cases, the weather data may be a best guess at local weather conditions for the building. For example, if the building is underground, or if another glass building reflects a lot of light onto it, then the values within the weather data may differ values recorded with other sensor devices at the building, however, the dilated convolutional neural network architecture is able to learn the relationship between this "imperfect" weather data and the energy consumption of the building, i.e. the weather data is still informative for prediction.

In another example, the dilated convolutional neural network architecture is configured to receive time-series data for the building comprising operational data for the building. This may be received as well as, or instead of, the weather data described above. Again, this data may be obtained in a similar manner to the weather data, e.g. from measurements from sensors within or upon the building and/or from indirect sources. The operational data comprises data that relates to the operational state of the building. This may comprise data associated with an opening and closing of the building, alarm data representing times the building is locked and an alarm is applied, security data representing people that enter and leave the building, and general occupancy data. Multiple different sources of data may be provided and dilated convolutional neural network architecture may accommodate so-called "raw" data where features have not been extracted, as these features may be determined automatically during training of the architecture. As with the weather data, the operational data may be resampled such that multiple input sources have a common sampling frequency (e.g., a common or shared time base). As such, the energy estimation system 410 may be communicatively coupled to one or more building data sources, e.g. from building services providers that provide an API to access this data over a network. The operational data may be considered as non-weather data and in certain cases may be non-weather dependent. In certain cases, the operational data may be obtained from an data source that is independent of a weather data source but the operational data may be correlated with the weather data, e.g. occupancy data for an outdoor swimming facility may be correlated with weather patterns but weather data may be obtained from a local weather monitoring station and occupancy data may be determined from entry gates and/or from energy load data.

In certain examples, occupancy data that forms at least a part of the operational data may be generated based on measured time-series energy consumption data for the building, such as the same measured time-series energy consumption data that is used as ground truth values for the training of the dilated convolutional neural network architecture. This is described later with reference to the example of FIG. 9. It has been found that operational data that is computed from measured energy consumption data provides enough input to provide accurate predictions without requiring historical measured energy consumption data as a time-series input. This then frees the energy estimation system 410 to predict future energy consumption data for the building using estimated operational data, e.g. where the operational data may be based on aggregate measures for determined partitions in the measured energy consumption data. It also helps prevent over-fitting and overdependency on values in the measured energy consumption data, resulting in a more robust energy estimation system.

In certain examples, the times-series data for the building may comprise multi-dimensional samples, e.g. where each sample in time has data from a different source including weather data and operational data. In certain examples, at least a portion of the time-series data may be determined from measured energy consumption values for the building. In certain test configurations, a time-series input comprised temperature, humidity and occupancy data for a particular building.

Figure 5:
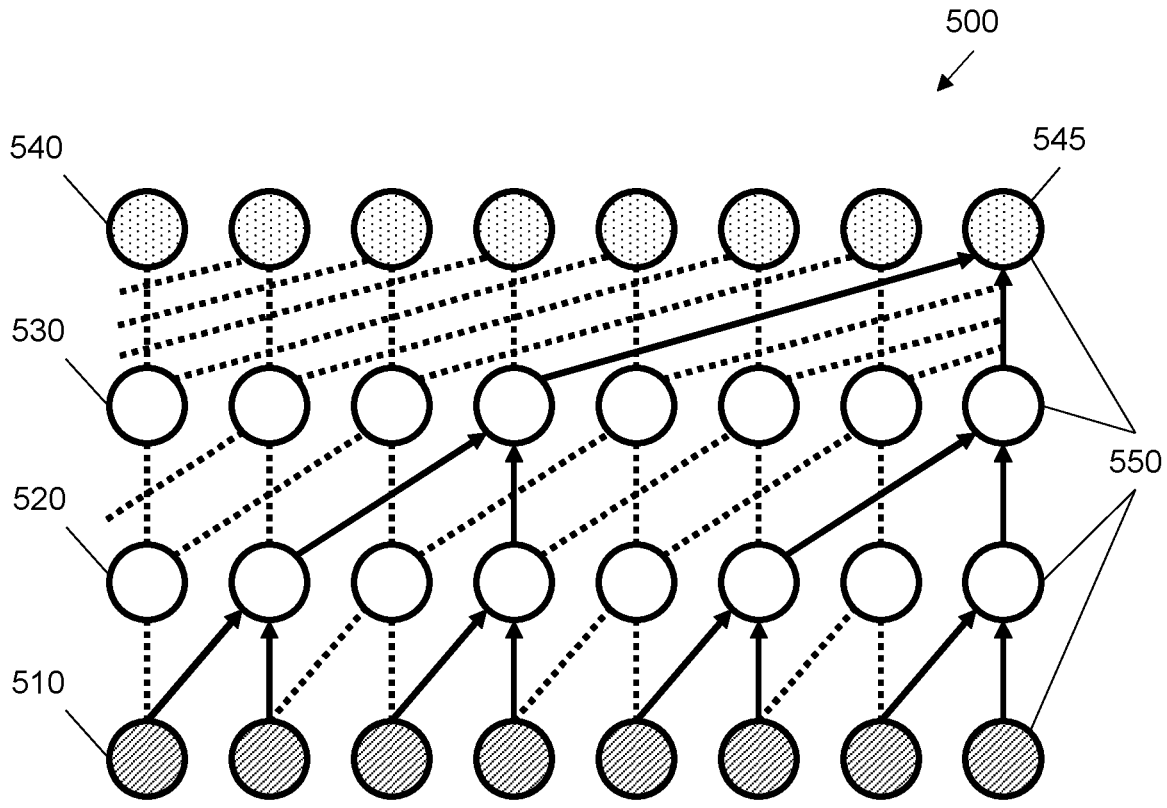
FIG. 5 is a schematic diagram showing a visualisation of an example portion of a dilated convolutional neural network.

A visualisation of a dilated convolutional neural network 500 is shown in FIG. 5. The arrangement of the dilated convolutional neural network 500 in FIG. 5 may form part of a larger dilated convolutional neural network architecture, e.g. form the core of such an architecture. FIG. 5 is provided as an example to describe the dilation of input within a dilated convolutional neural network and actual implementations may differ in practice (e.g. may have a different number of layer or temporal stride). Dilated convolutional neural networks are known in the art and have been applied with success to sound data, such as in the paper "WaveNet: A Generative Model for Raw Audio" by Aaron van den Oord et al. published on arXiv on 12 Sep. 2016, which is incorporated herein by reference. They have not, however, been used as part of a system to help reduce the energy consumption of buildings in the manner described herein. FIG. 5 and the description below provides a high-level overview of how a dilated convolutional neural network is configured, and particulars of a system for estimating the energy consumption of a building are described with reference to the following examples.

The dilated convolutional neural network 500 of FIG. 5 comprises an input layer 510, two hidden or latent layers 520, 530 and an output layer 540. The hidden layers are so-called because they form a "hidden" part of a non-linear mapping between an input applied to the input layer 510 and an output retrieved from the output layer 540. Two layers are shown for example here, but actual implementations may have a number of layers as determined based on a receptive field as described below. As per known descriptions of neural network models, each layer comprises a plurality of nodes or neurons 550. Each node 550 receives a number of inputs (e.g. a real number) and applies a weight to each input to generate an output. The node 550 may also apply a bias and/or a non-linearity to generate the output. In a conventional convolutional neural network, each node has a limited number of inputs that correspond to a receptive field, where the receptive field corresponds to a size of one or more filters that are convolved with the input to the layer. In a conventional convolutional neural network, the convolution applied by each layer may be thought of as sliding a fixed-size filter over the input to the layer, where each set of input values within a receptive field corresponding to the fixed-size of the filter generates an output value after the filter is applied. The filter may be applied by taking the dot product of each set of input values within a receptive field and the filter coefficients. Popular convolutional neural networks for image processing tend to use small filter sizes such as 3 by 3 or 9 by 9 pixels for two-dimensional image input. The filter coefficients are learnt by the convolutional neural network during training, e.g. by backpropagating an error through the convolutional neural network and using gradient descent to modify the filter coefficients in a manner to minimise the error. Normally, several filters are applied in parallel and the number of filters and size of the filters are set as hyperparameters. As such a convolutional neural network applies a series of sliding transformations to the data to reduce its complexity and weights or coefficient values are learnt from underlying trends in the input data.

A dilated convolutional neural network has a similar structure to the convolutional neural networks described above, however, in the "dilated" case, a receptive field of a node in a neural network layer varies in size across the layers. In the example of FIG. 5, each node in layers 520, 530 and 540 receives an input from two nodes of a lower layer, however, the input nodes are differently spaced for each of these layers. Hence, the receptive field, i.e. the number of original input nodes that can provide input to a particular node, grows in size with each layer. In the example of FIG. 5, each node in layers 520, 530 and 540 has a filter size of two (i.e. receives two inputs), and as described above, the filter size may be set as a hyperparameter of the dilated convolutional neural network. A further "dilation" or stride hyperparameter then sets the spacing between inputs. For example, the first hidden layer 520 has a dilation of 1, as each node receives consecutive inputs from the input layer 510; the second hidden layer 520 has a dilation of 2 as each node receives inputs from consecutive second nodes in the first hidden layer 520; and the output layer 540 has a dilation of 4, as each node receives inputs from consecutive fourth nodes in the second hidden layer 530. The output node 545 in the output layer 540 thus has a receptive field that may take into account values from all eight input nodes in the input layer 510. In this manner, the receptive field grows exponentially as more layers are added. This is in contrast to a conventional convolutional neural network, where each layer has filters of a fixed size (e.g. commonly areas of 3 by 3 pixels as mentioned above). As is shown in FIG. 5, each node in the output layer 540 represents an integration of data from consecutive groups of eight input values. At each layer, patterns of different temporal scales may be learnt and non-linear relationships across the layers may be modelled. By controlling the amount of dilation, and the number of layers, a dilated convolutional neural network can learn from larger amounts of historical data without exponentially increasing the number of nodes. This means that training time is dramatically faster than comparative approaches, such as recurrent neural network (RNN) architectures. The present examples use this neural network architecture to forecast time-series data representing building energy data. It should be noted that the dilation shown in FIG. 5 is necessarily simplified and that actual implementations may have much larger receptive fields (e.g., as described in more detail later below).

Figure 6:
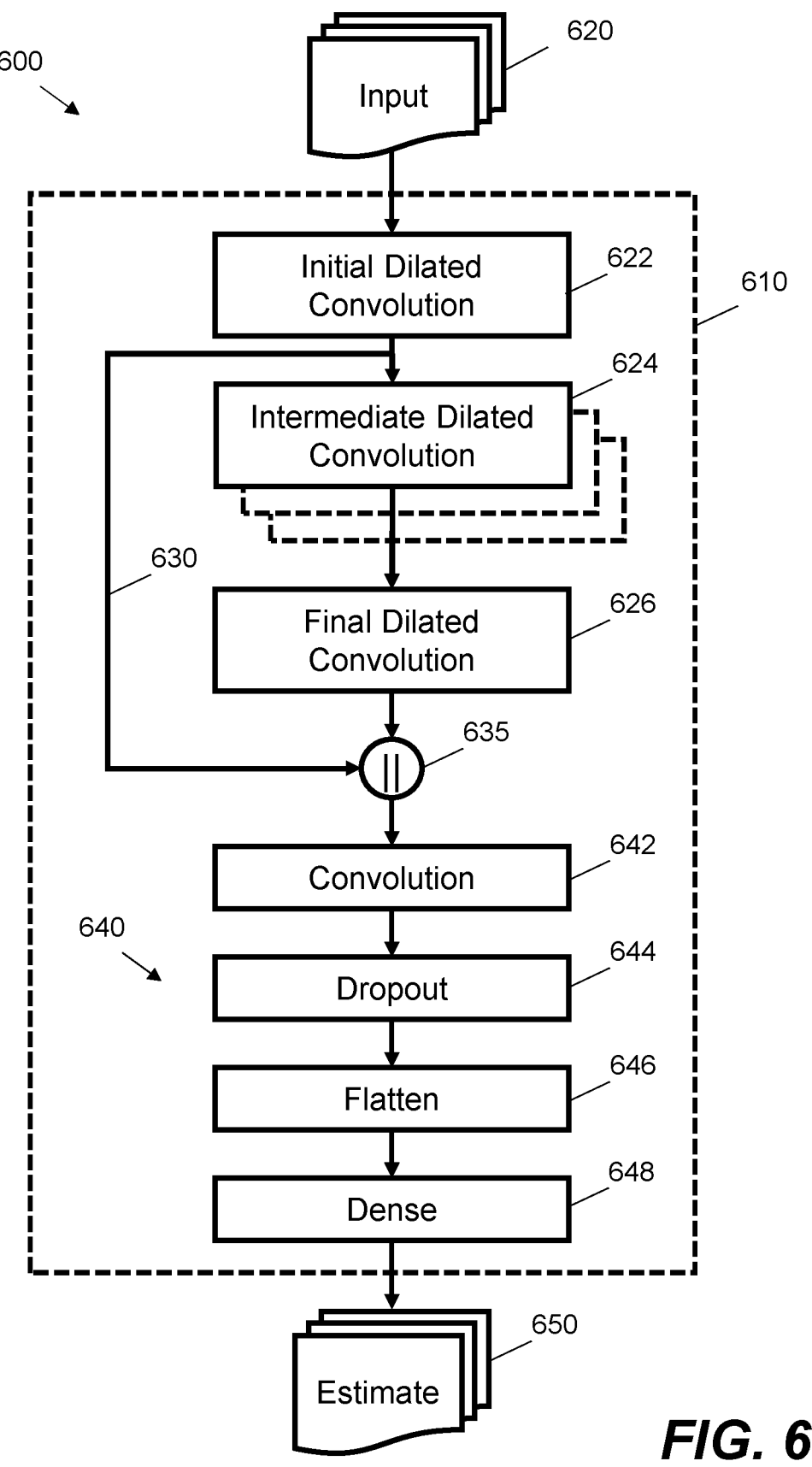
FIG. 6 is schematic diagram showing example components for a dilated convolutional neural network architecture for use in the implementation of an energy estimation system for a building.

FIG. 6 shows an example 600 of a dilated convolutional neural network architecture 610 that uses a dilated convolutional neural network as explained with reference to FIG. 5. The dilated convolutional neural network architecture 610 receives a time-series input 620 and generates one or more time-series data points 650 representing an estimated energy consumption for the building. The dilated convolutional neural network architecture 610 may thus be used to implement the energy estimation system 410 of FIG. 4. The time-series input 620 may comprise one or more of weather data and operational data as described above.

The core of the dilated convolutional neural network architecture 610 is a set of dilated convolution layers. These dilated convolution layers comprise an initial dilated convolution layer 622, one or more intermediate dilated convolution layers 624 and a final dilated convolution layer 626. These dilated convolution layers may respectively correspond to the first hidden layer 520 of FIG. 5, the second hidden layer 530 of FIG. 5 and the output layer 540 of FIG. 5, where the provision of the time-series input 620 forms the input layer 510. With this equivalence, it should be noted that the final dilated convolution layer 626 in FIG. 6 does not comprise the output of the dilated convolutional neural network architecture 610, and that the architecture may comprise additional processing components before a final output. As shown in FIG. 6, the one or more intermediate dilated convolution layers 624 may comprise a single layer or a plurality of layers. The depth of the dilated convolutional neural network employed by the dilated convolutional neural network architecture 610 may be controlled by setting the number of intermediate dilated convolution layers 624 (e.g. as indicated by the dashed lines in the diagram). The number of intermediate dilated convolution layers 624 may comprise a hyperparameter of the dilated convolutional neural network architecture 610 that is set via experiment and/or based on the time base of the time-series input 620 (e.g. input with a higher time resolution may require more layers to accurately learn patterns at different temporal scales). The dilated convolution layers may comprise one-dimensional (1D) convolution blocks. These blocks may receive a time-series of vector inputs, e.g. representing different input elements, but may only apply convolution in the time dimension (i.e. along a length of the time-series signal). For example, a convolution within the time dimension may be thought of as a weighted sum of a windowed set of consecutive time samples. This differs from a two-dimensional convolution for image processing where convolution is applied in both spatial dimensions of an input two-dimensional signal.

In an example test implementation, each dilated convolution layer in the set of dilated convolution layers comprised 32 filters with a kernel size of 2. A RELU (REctified Linear Unit) activation function was used together with a causal padding of the data. A dilation rate was set as $2^N$ where N is the number of layers. The number of layers may be selected to generate a desired size of input receptive field. This is further discussed below. As example settings, the convolution kernels were initialised using a Glorot uniform initializer and the bias weights were initialised to 0.

In general, the time-series input 620 is a series of sequences which the dilated convolutional neural network learns from in order to predict a series of sequences in the form of the output estimate 650. The main building block for the architecture is the convolution performed in each layer on an input determined using a dilation parameter. Put simply, a convolution is a method of taking a filter, which is typically smaller than the extend of the time-series input 620, and multiplying its weights with input values and summing them to get a single value. The process of sliding, or convolving, the filter across the data gives it its name. By using a series of convolution operations in each dilated convolution layer, the dilated convolutional neural network architecture 610 is able to learn to simplify the input data and determine overall trends that allow accurate output predictions.

In certain test examples, it was determined that, for input data with at least an hourly sample frequency, a receptive field of the final dilated convolution layer 626 of a week or more generated accurate predictions. In cases with a sampling rate of 15 or 30 minutes, good accuracy was found when the dilated convolution layers 622, 624, 626 were arranged such that the final dilated convolution layer 626 has a receptive field of around 3 weeks, equal to around 500 to 2000 input time samples—3 weeks*7 days*24 hours per day*2 to 4 samples per hour. For example, each output neuron 545 as shown in FIG. 5 may receive a contribution from 3*7*24=504 points if the data is sampled hourly, 3*7*48=1008 points if the data is sampled half-hourly, and 3*7*96=2016 points if the data is sampled every 15 minutes. In these cases, number of layers (N above) may be selected to provide the closest approximation to these desired receptive fields, e.g. the nearest integer value to log 2 (datapoints)—so N may equal 9 for hourly data (receptive field=$2^9$=512 ~504) or 11 for 15-minute samples (receptive field=$2^{11}$=2048~2016). The input samples may be configured such that they have a length equal to the receptive field of the final dilated convolution layer 626, e.g. each input sample may be of length 512 to 2048 in a time dimension.

In certain examples, a stride value for the input data samples may be selected that provides suitable training data and good accuracy. For example, if the dilated convolutional neural network architecture 610 is configured to predict 24 hours of output samples, and a receptive field of around 3 weeks is used, then data samples for training may be selected as overlapping sets of time-series input data. For example, a first data sample may cover the first 21 days of the input time-series data, then a second data sample may be selected by moving 24 hours along and selecting a next 21 days of the input time-series data, where there is an overlap of 20 days between the samples. Data samples may be generated by striding through sets of time-series input data in this manner, and this also increases a number of training samples available to train the dilated convolutional neural network architecture 610 (e.g. as compared to taking non-overlapping sets of data covering 21 days). This makes it possible to train the dilated convolutional neural network architecture 610 with around a year of input time-series data.

In certain examples, an energy estimation system such as 410 in FIG. 4 may simply use a dilated convolution neural network as shown in FIG. 5 or as embodied in the sets of dilated convolution layers 622, 624 and 626 in FIG. 6, i.e. an output may be retrieved from the output of the final dilated convolution layer 626. In other examples, additional components may be optionally provided to improve an accuracy of prediction. FIG. 6 shows two sets of additional components: at least one skip connection 630 and a set of post-processing components 640. These may be applied separately and/or together, depending on the implementation. It should be noted that the arrangement and configuration of these sets of additional components may vary between implementations, while FIG. 6 shows a suggested arrangement that has been found to work well in tests, those skilled in the art will understand that numerous variations may be made (e.g. in the number, location and/or connectivity of the components) while still applying the general functional teaching of the examples.

In the example dilated convolutional neural network architecture 610 of FIG. 6, the at least one skip connection 630 communicatively couples a location before the one or more intermediate dilated convolution layers 624 and a location after the final dilated convolution layer 626. An output from the initial dilated convolution layer 622 "skips" both the one or more intermediate dilated convolution layers 624 and the final dilated convolution layer 626 and is combined with the output of the final dilated convolution layer 626. In the example dilated convolutional neural network architecture 610 of FIG. 6, the output from the initial dilated convolution layer 622 is concatenated with the output of the final dilated convolution layer 626 at concatenation component 635. The skip connection provides a "short cut" for backpropagation from the output during training and thus improves the training of the earlier dilated convolution layers, such as the initial dilated convolution layer 622. It also allows the coarse output of the final dilated convolution layer 626 (e.g. a more heavily processed temporal signal incorporating more long-range patterns due to the dilation across the layers) to be combined with the much finer output of the initial dilated convolution layer 622 (e.g. a less heavily processed temporal signal incorporating more short-range patterns). Further information on skip connections may be found in the paper by J. Long at al., "Fully Convolutional Networks for Semantic Segmentation" (arXiv, 2015), which is incorporated by reference herein.

In the example dilated convolutional neural network architecture 610 of FIG. 6, the set of post-processing components 640 comprise a convolution layer 642 (non-dilated), at least one dropout layer 644, a flattening layer 646 and a dense or fully-connected layer 648.

The convolution layer 642 receives data from the at least one skip connection 630 and the final dilated convolution layer 642, i.e. following concatenation at the concatenation component 635. The convolution layer 642 may comprise a one-dimensional convolution that is applied in the time direction or axis. The convolution layer 642 may be used to further combine and process the concatenated data prior to output. In effect, the convolution layer 642 applies one or more filters to learn further patterns in the concatenated data. In a test implementation, the convolution layer 642 was defined with 8 filters, a kernel size of 1, a RELU activation function, a bias initialised to 0 and the weights of the kernel initialised using a Glorot uniform initializer.

The at least one dropout layer 644 is arranged following the convolution layer 642 in the example 600 of FIG. 6. The use of dropout layers is known in the art, for example from the 2014 paper by Srivastava, N. et al.—"Dropout: A Simple Way to Prevent Neural Networks from Overfitting"—published in The Journal of Machine Learning Research (JMLR) (1929-1958), which is incorporated by reference herein. The at least one dropout layer 644 is used in training to "drop" certain elements in the processed data (e.g. set to 0 or a custom low value) to prevent overfitting and help generalisation. Dropout may be applied by randomly setting a certain proportion of elements to zero (e.g., "hiding" these elements) such that the weights of nodes within the dilated convolutional neural network architecture 610 are updated irregularly, i.e. so that each weight update does not include all nodes of the architecture. During prediction or inference, the at least one dropout layer 644 is not applied such that all nodes within the architecture are available to predict the output estimate 650. A location between the convolution layer 642 and the flattening layer 646 (prior to the dense layer 648) was found to be a good location for dropout to be applied to produce accurate predictions. Dropout may be applied using a dropout layer as defined in a neural network programming library. In one test implementation, a dropout layer was used where input units to the layer were set to 0 with a defined frequency ("rate") at each step during training. Inputs that are not set to 0 may be scaled up (e.g. by $1/(1\text{-rate})$) such that the sum over all inputs remains unchanged. A test value of the defined frequency was 0.5.

Lastly in the example 600 of FIG. 6, the flattening layer 646 and the dense layer 648 are applied to provide the output estimate 650 in a desired form. The flattening layer 646 takes a possibly multi-dimensional array that is output from the previous set of neural network layers and flattens it to a one-dimensional array or vector. For example, if the time-series input 620 comprises a series of vectors, where each vector represents a sample at a point in time and each element within the vector represents a different source of input data, then the time-series input 620 may comprise a two-dimensional array, typically with a greater length in a time dimension or axis. One dimensional convolutions may be applied along the time dimension or axis via the convolution layers 622, 624, 626 and 642, leading to a two-dimensional input to the flatten layer 646. If different sources of input data are set out on different rows of the two-dimensional input and temporal aspects are aligned with the columns of the two-dimensional input, then the flattening layer 646 may flatten the data by taking the transpose of each column (e.g., shifting the data source dimension to be aligned with the temporal dimension) and then concatenating the transposes (or alternatively concatenating each column into a single one-dimensional column). The flattened one-dimensional output of the flattening layer 646 is then input to the dense layer 648, which applies a feed-forward or standard fully-connected neural network layer. The output size of the dense layer 648 may be configured to represent a length of time samples for predicted energy consumption data. In tests where the time-series data for the building has at least an hourly sampling frequency, predicting a day of data was found to provide good results. In these cases, the dense layer 648 may generate a one-dimensional output (representing different time samples of energy consumption data) of length 24 to 96 elements. The length may be configured based on the desired sampling frequency of the output predictions, where it may be preferred to use an output sampling frequency that matches a sampling frequency of the time-series input 610 (and/or a sampling frequency of the energy consumption data used as training data). In a test implementation, the dense layer 648 was defined with a RELU activation function, a bias initialised to 0 and the weights of the kernel initialised using a Glorot normal initializer. The dense layer 648 in this test implementation used 16 neurons per previous layer neuron (e.g. had 16 units)—so if the previous layer had 10 neurons, the dense layer 648 would have 160 neurons. The dense layer 648 may be used to make additional connections from the dilated final layer neurons that the dilated layers have missed. The final output estimate 650 may be generated by using a further dense neural network layer with a linear activation function (i.e. a(x)=x) that receives the output of the previous dense layer 648 (such that there is a first dense layer with a non-linear activation function and a second dense layer with a linear activation function that provide the output).

In the above examples, the term "neural network layer" is used with its conventional meaning in the art of machine learning to describe an input-to-output mapping via the application of one or more of a series of weights, a bias and a non-linearity. The neural network layers described above may be implemented using programming tools such as TensorFlow® from Google, Inc. or PyTorch® from Facebook, Inc, which provide object-oriented program code (classes) to implement layers of different types. Dilated convolution neural network layers may be defined by customising the input arrays for convolution neural network layers and/or may be defined using provided dilated convolution neural network definitions. Example parameters for a test implementation are set out in this text but those skilled in the art will understand these are for guidance only. They may vary in different implementations depending on the implementation circumstances and the tools that are used to define the system. Parameters are provided such that those skilled in the art may recreate a test system but it should be noted that parameters may vary per implementation and may be selected as appropriate for individual implementations.

In implementations, the time-series input 620 may be configured based on available data for a building, e.g. one or more of weather data and operational data. The dilated convolutional neural network architecture 610 may also receive additional non-time-series input, such as building properties and other metadata, and this additional input may be received by one or more of the neural network layers shown in FIG. 6, including the later convolution layer 642 and the dense layer 648. However, in preferred examples, a limited number of time-series inputs are used (e.g. weather data and occupancy data), as dilated convolutional neural network models constructed in this manner provide an advantageous trade-off between speed of training, accuracy and applicability. In one case, the additional input may be concatenated by concatenation component 635 in addition to the data sources shown in FIG. 6.

In the examples described above, the dilated convolutional neural network architecture comprises a plurality of parameters, in the form of the weights and/or biases of the neural network layers 622, 624, 626, 642 and 648. Values for these parameters are learnt by the architecture using a training operation or stage. As described above, during the training stage, the values are modified using back-propagation and gradient descent. Different methods of training may be applied as is known in the art. The training operation involves generating training samples that include input data and expected or ground-truth output data. In the present examples, training data may comprise input data covering a predefined time period and output data covering measured energy consumption data for a time subsequent to the predefined time period. The dilated convolutional neural network architecture may be trained by dividing a set of time series data covering an available period into a plurality of windowed data segments split into input and output sections. For example, time-series data for a number of years may be split into a plurality of windows (e.g. by setting an advancing temporal stride between each window), where predictions are then made in regard to a day of output data. Time-series data for training may be obtained from one or more of historical weather data and operational data. For time-series data for the buildings with at least an hourly sampling frequency, it was found that around a year of data split into overlapping advancing training samples provided a good quantity of input data for training and accurate predictions. The amount of input data required for each training sample may be selected based on sampling frequency and a (temporal) size of the output prediction.

In certain cases, the dilated convolutional neural network architecture may be trained individually for each building, i.e. each building may have a separate set of parameters and a separate model. In other cases, a common set of parameters may be used, either for all buildings or for buildings of a common type and within a given group of buildings with shared building properties (e.g., office buildings of a given size). In tests, it was found that energy consumption patterns often change considerably between buildings, even between buildings of a common type. If a set of buildings demonstrate different energy consumption patterns within measured data, it may be preferred to train the dilated convolutional neural network architecture such that different buildings have different parameter sets, i.e. to train one set of parameters for the building using only data relating to that building. For example, test data indicated that the response of each building to weather and operational data varied considerably among groups of buildings. This may be for many reasons, including for instance, the physics of building and the building usage type. Hence, a common dilated convolutional neural network architecture may be used for different buildings but parameter values for that architecture may be trained, and predictions made, on a per-building basis (i.e. one "model" per building based on parameter values).

In one case, the dilated convolutional neural network architecture may be configured to be trained online using consecutive sets of time-series data for the building. In this case, parameter values for a given building may be learnt by incremental training over time as new data is received. For example, time-series input data may be used to predict a time within the future and then, when that time in the future elapses, the architecture may be trained by comparing the predicted future values and the actual measured values for the building. The present dilated convolutional neural network architectures are able to learn from an exponentially increasing amount of historical data, without training time being affected exponentially. In tests with a computer device and a commonly available graphics processing unit, training took a matter of seconds (e.g. fast enough for training to appear instantaneous or near instantaneous when using an interactive user interface) for the specific architecture shown in FIG. 6, which makes online training possible. It should be noted that a comparative architecture using Long Short-Term Memory (LSTM) units took over 8 hours to converge during training on a set of usable parameters for a given building. Hyperparameters may be selected based on specific implementations with regard to one or more of accuracy, bias and training time metrics. For example, it was found in tests that complex models with very large dilations had comparable accuracy but took longer to train, and so simpler models with the dilations as described above were preferred. Training may be continued and then stopped based on a training loss (e.g., various early stopping criteria may be applied).

Figure 7:
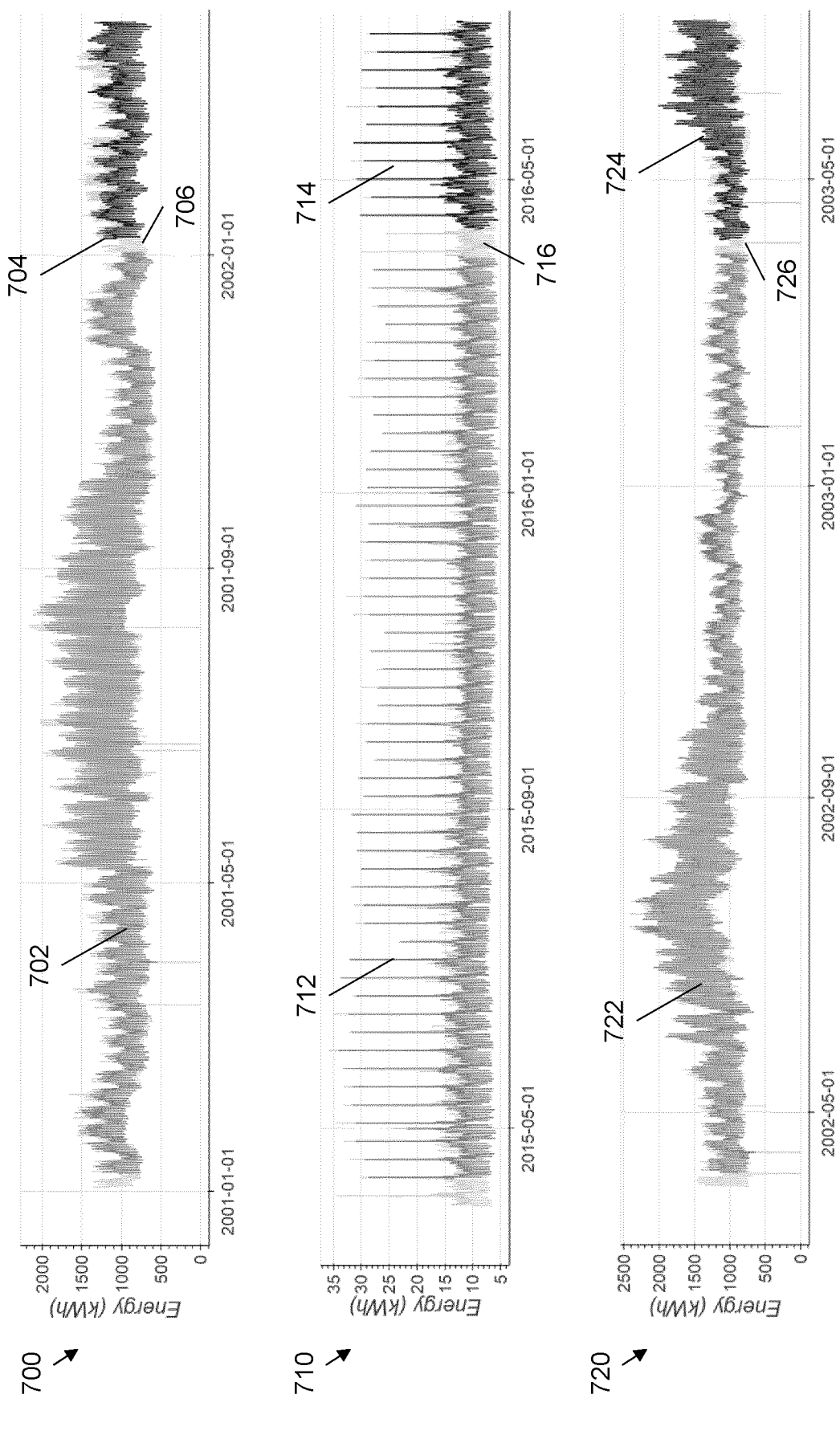
FIG. 7 is a set of charts showing measured and predicted energy consumption data according to examples.

FIG. 7 shows tests results from an energy estimation system arranged similar to the example of FIG. 6. FIG. 7 shows three charts 710, 720, 730 of energy consumption with time. Sampling frequencies were every 15 or 30 minutes for the test data and energy consumption was measured in kilo-Watt hours. The building types covered by the tests include office, hotel, leisure centre, farm, manufacturing and food producing facilities, located in the United Kingdom and the United States of America. As may be seen in FIG. 7, each building has a different energy consumption profile. Each chart shows a first portion 702, 712, 722 of the time-series data that was used for training and a second portion 704, 714, 724 of the time-series data that was predicted by the trained energy estimation system. The original measured data 706, 716, 726 for the time period is also shown. These charts show that the trained energy estimation system accurately learns the complex temporal patterns to produce accurate energy consumption estimates, including the capture of both daily and seasonal patterns in energy consumption. (In FIG. 7, the short gap between training and test data portions is due to the desire to separate training and test data portions and represents an example receptive field of the system.)

In certain cases, the energy estimation system may be used for building energy simulation. Best practice for comparative building energy simulators, e.g. those that use advanced physics models, is that simulations of building energy consumption should have a Normalized Mean Bias Error (NMBE) and a Coefficient of Variation of the Root Mean Square Error (RMSE) CV of below 5% and 15%, respectively, for monthly data. If hourly data are used, these requirements shall be 10% and 30%, respectively. In a series of tests, these requirements were met by an energy estimation system as configured according to the example 600 of FIG. 6, demonstrating that the systems described herein may be used as a fast and accurate replacement for comparative building energy simulators.

Figure 8:
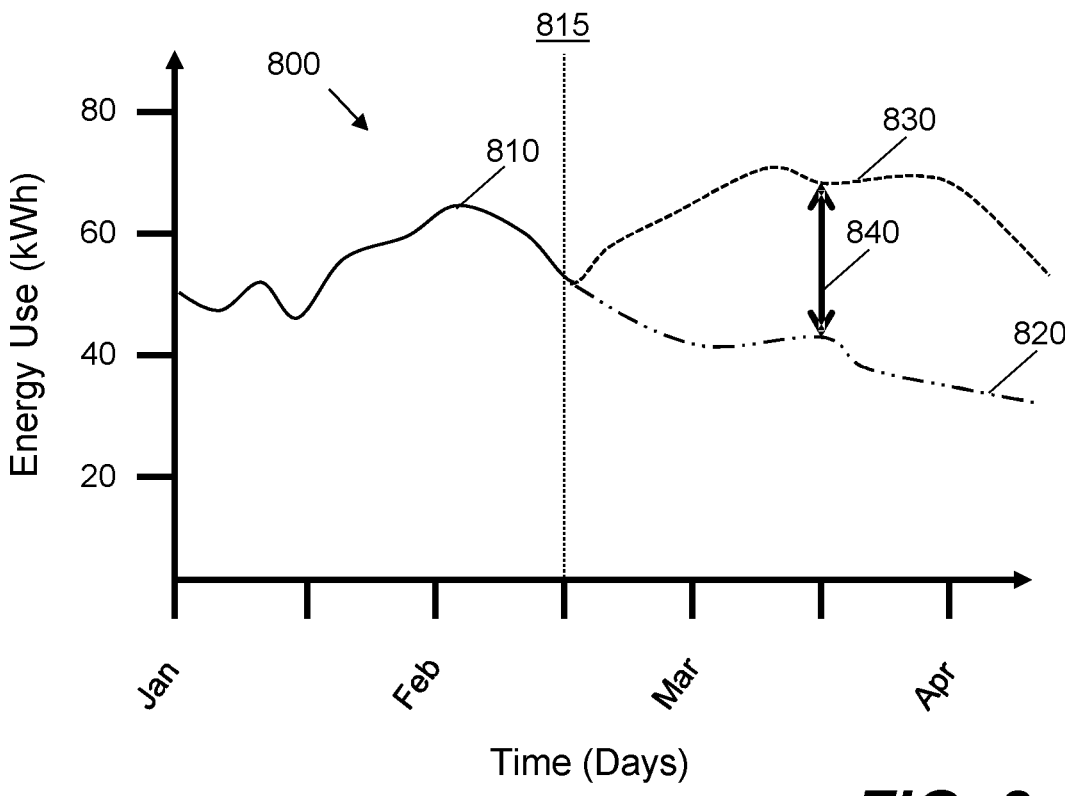
FIG. 8 is a visualisation showing a comparison between measured and predicted energy consumption for a building.

FIG. 8 shows one potential use case for the energy estimation systems described above. In this case, an energy estimation system is trained as described above for a particular building. For example, a local or remote smart meter may incorporate the energy estimate system of FIG. 4 or 6. The energy estimation system provides display data for a display device (e.g., either a locally coupled display and/or a web-based smartphone or tablet interface) similar to the chart 800 of FIG. 8. The chart shows energy consumption over time for a building, in the present case, on a timescale of days over several months. Portion 810 of the chart represents measured consumption data, e.g. as may be plotted from a standard smart meter output. At time 815, a modification is made to the building to reduce energy consumption. This may comprise a physical change in the building, e.g. the retrofitting of insulation or new glazing, or a behavioural change for occupants of the building, e.g. a change in the number of people per room or opening hours. In comparative cases, when these changes are made, it is often difficult to know whether the change was effective. This is especially the case for more complex commercial buildings and building complexes that display complex multi-scale temporal patterns. For example, it may appear that energy consumption has fallen, but this may just be a regular seasonal pattern rather than due to the modification. However, using the described energy estimation system, the system may be trained on the measured data 810 (i.e. historical data before the modification) and then be used to predict energy consumption after the modification. In FIG. 8, a predicted energy consumption is shown by line 830. The predicted energy consumption may then be compared with the actual measured energy consumption, which in FIG. 8 is shown by line 820, and a meaningful evaluation of the modification may be performed. In FIG. 8, the modification causes a significant difference 840 between the predicted energy consumption and the measured energy consumption, indicating that the modification has causally reduced energy consumption. In other cases, if the difference is small, then this indicates that the modification has not causally reduced energy consumption. These differences may thus be evaluated without requiring a material reduction in energy consumption, e.g. if a modification is made at the start of winter and/or heavy use, then energy consumption may actually rise, but not by as much as is predicted. The accurate prediction generated by the energy estimate system thus allows evaluation of energy saving approaches in many different circumstances.

In another case, the energy estimate systems described above may be used to alert a user or building manager to potential high energy consumption in the future. For example, weather forecast data may be provided as input for a future time period as well as averaged occupancy data based on historical energy consumption data. In this case, forecast bad weather conditions (such as storms, snow and/or other cold periods) may result in high predicted energy consumption values, e.g. predicted energy consumption values that are greater than a predefined threshold and/or a comparative time period, such as the same date for a previous year. This may allow for a smart meter that is able to warn a user of such high usage so that they can decide if they need to consider any specific, for instance, behavioural changes, to reduce the energy consumption. For example, a user may be provided with "high usage alerts".

One variation of the present examples will now be described with reference to FIGS. 9, 10A and 10B. In this variation, operational data for input to the energy estimation system of the previous examples is generated from measured energy load data. In particular, measured energy load data, such as the energy consumption data shown in FIGS. 1 and 7, is used to generate occupancy data that may be used as an additional time-series input.

Figure 9:
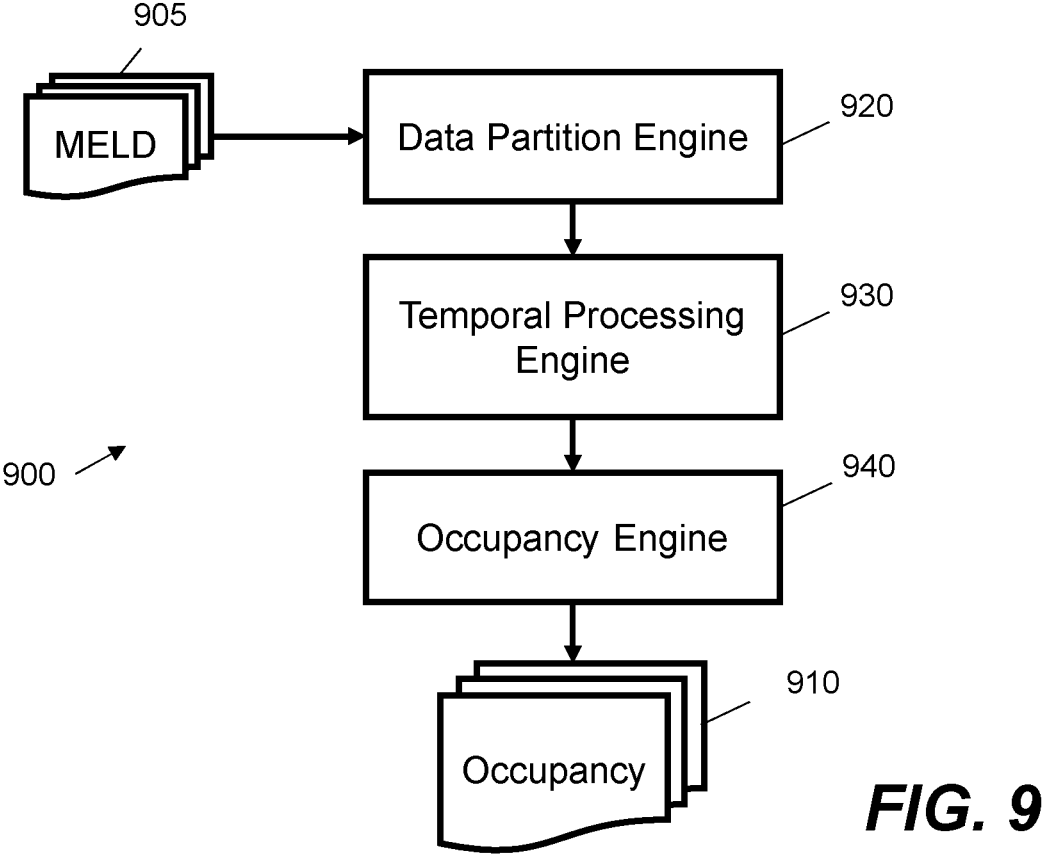
FIG. 9 is a schematic diagram showing example components to generate input occupancy data.
Figure 10A:
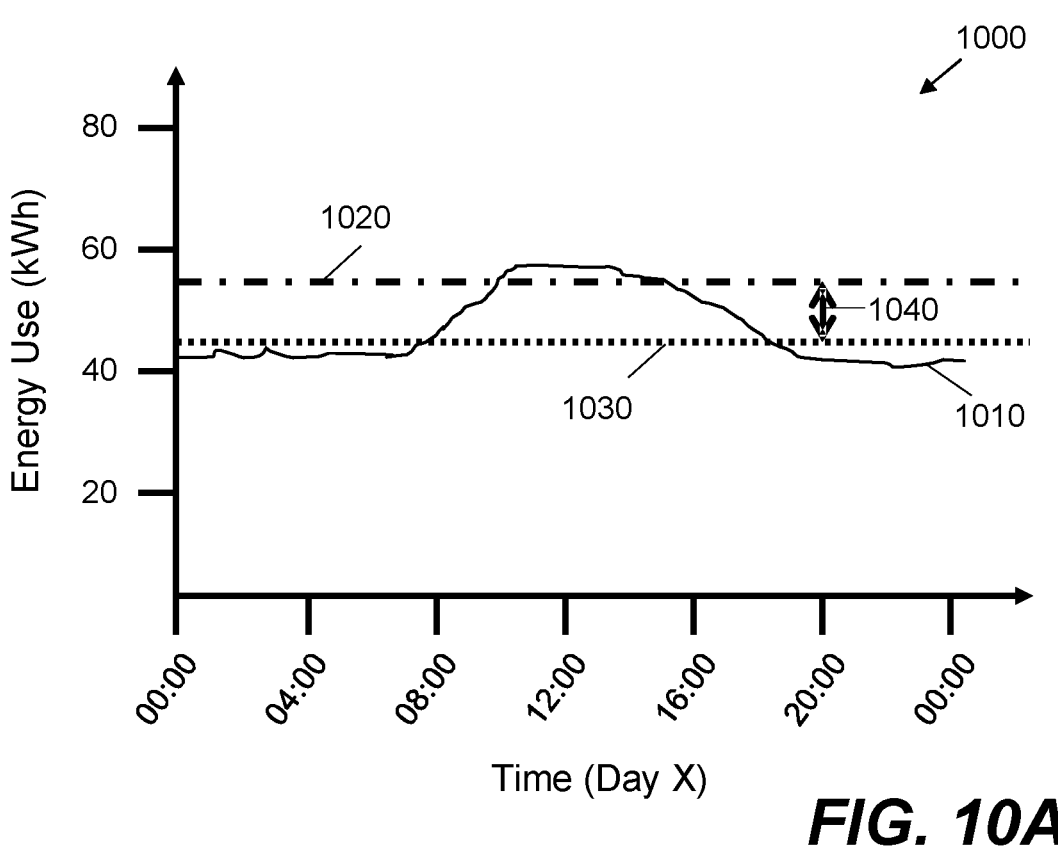
FIGS. 10A and 10B are visualisations showing how partitioned energy consumption data may be used to determine occupancy data for a building.

FIG. 9 shows an occupancy data generator 900 to receive measured time-series energy consumption data 905 for the building and to generate occupancy data 910 for the building. The occupancy data generator 900 comprises a data partition engine 920, a temporal processing engine 930 and an occupancy engine 940. In this example, the data partition engine 920 is provided to improve accuracy when the energy load data has unpredictable shifts or changes in the data (e.g., as shown in the data in FIG. 1). In cases where the energy load data does not display these shifts or changes, one or more of the temporal processing engine 930 and the occupancy engine 940 may be applied directly to the energy load data 905 to determine occupancy data 910.

In certain examples, the data partition engine 920 is configured to apply a clustering model to the energy load data 905 to determine one or more partitions within the energy load data. This may then be used to differentially process the energy load data 905 for different partitions or period within the data. The temporal processing engine 930 is configured to segment and aggregate the energy load data over a set of predefined time periods. When no partitioning is to be performed, this may be applied directly to the energy load data 905. When partitioning is to be performed, the temporal processing engine 930 may be independently applied to each partition determined by the data partition engine 920. In these examples, the occupancy engine 940 is configured to estimate periods of occupancy for the building using the output of the temporal processing engine 930. The occupancy engine 940 is thus configured to determine estimated periods of occupancy from the energy load data

905 and output these as occupancy data 910. The occupancy engine 940 may format the occupancy data 910 to have a time base that is compatible with the time base of other input data for the energy estimation system.

The clustering model applied by the data partition engine 920 may comprise a supervised or unsupervised machine learning model. In certain implementations, an unsupervised machine learning model may be preferred, as this may be applied without requiring a training set of labelled samples. The partitions may comprise assigned groups or clusters of data samples. Constraints may be applied to the clustering model, such as partitions are to be continuous over time within the energy load data and/or prior probability distributions for the number of partitions. Partitions may be labelled by assigning a partition identifier to data samples within the energy load data 905, e.g. a first set of data samples may be assigned to a first partition with a partition identifier of "01" and a second set of data samples may be assigned to a second partition with a partition identifier of "02". In one case, a new data structure may be created, e.g. the same length as a one-dimensional array comprising a time-series of energy use values, to store a partition identifier for corresponding elements in the energy load data 905. In other cases, different data structures (e.g., different arrays) may be created to store the energy load data corresponding to each partition.

In certain examples, the clustering model applied by the data partition engine 920 comprises a probabilistic mixture model. In this case, each partition may be associated with a particular mixture in the probabilistic mixture model. Each mixture may have a set of parameters that define the mixture (e.g., that define a probability distribution for the mixture). In a preferred case, the probabilistic mixture model comprises a Gaussian mixture model. In a Gaussian mixture model, different partitions may be defined as different Gaussian probability distributions (e.g., with different mean and covariance parameters), where each Gaussian probability distribution may also have a probability for any given data sample. In this case, the data partition engine 920 may apply an expectation maximisation function to determine parameters for the Gaussian mixture model. These parameters may then be used to apply a partition identifier to each data sample (e.g., based on a probability of each data sample belonging to each Gaussian probability distribution).

In the case that a Gaussian mixture model is applied, the data partition engine 920 may be configured to apply Bayesian inference to infer probabilistic distributions for the parameters of the Gaussian mixture model. For example, Bayesian methods of variational inference may be used that optimises a lower bound on model evidence including Gaussian mixture priors (i.e. the probabilities of each Gaussian probability distribution). Bayesian inference may use a Dirichlet distribution to model the mixture priors. Bayesian methods of variational inference may provide for improved modelling of the number of partitions, by down-weighting certain mixtures more effectively and so reducing the number of partitions that are deemed to be present; from testing, this approach appears to better match human intuition for the number of partitions that are present. Bayesian methods may be more resource intensive, and so may be preferred if suitable computing resources are available, e.g. may be better suited to remote server implementations that are shown in FIG. 3. Gaussian mixture model fitting methods, including Bayesian methods, may be implemented using machine learning libraries, such as scikit-learn or Matlab® and/or via custom programmed implementations. Default parameters for these methods may be used with appropriate variations depending on the implementation.

In a test case, the BayesianGaussianMixture method of the scikit-learn package was used with a number of initializations (n_init) equal to 20, a convergence threshold/tolerance of 1e-3, a "full" convergence type (each partition/component has its own general covariance matrix), a maximum number of expectation maximisation iterations (max_iter) of 500, the use of k means to initialise the weights (init_params="kmeans"), and a Dirichlet process (or so-called "stick-breaking process") for the weight concentration prior (weight concentration_prior_type="dirichlet_process").

When applying a Bayesian Gaussian mixture model, a number of mixture components (i.e. partitions) may be set based on knowledge of the energy load data. This may represent a maximum number of components whereby the Bayesian estimation may determine that an actual number of components is less that the maximum number of components. In the BayesianGaussianMixture method of the scikit-learn package this may be set using the n_components parameter. The number of components may thus represent an upper bound on the number of components to aid computational efficiency. In one case, a number of mixture components may be based a minimum time span for a partition within time-series energy consumption data. For example, a minimum time span may be set as a particular number of days within the time-series energy consumption data. In test cases, it a minimum number of days was set at 90 days (approximately 3 months) such that longer term changes across a year are identified. In this case, for a years' worth of data, the (maximum) number of mixture components may be set as 4 (i.e. 365/90). In certain cases, post-processing of the partitions may tend to reduce a number of final partitions that are output—hence, often the number of output partitions is less than the (maximum) number of mixture components. It should also be noted that although a number of components may be predefined, weights for some of these components may be set to 0, such that even if the number of components is set to 4, 5 or 10 over a given time period, only one partition may be determined to be present (e.g., only one partition may have non-zero weights and/or a suitably high probability value). The details here are intended for example only based on a test case, different hyperparameter configurations from those described may be used for different implementations, for different buildings and for different sets of energy load data, amongst others.

In certain examples, the data partition engine 920 outputs a set of labelled partitions of the energy load data, e.g. there may be n partitions where n is greater or equal to 1. In the data shown in FIG. 1, two partitions were identified in test cases: one prior to July and one after July. The value n may be set by a user as part of the clustering model, or, preferably, may be determined from the energy load data 905 by the clustering model (e.g., as may be the case with Bayesian Gaussian mixture models). In this case, the labelled partitions are received by a temporal processing engine 930. In certain examples, the temporal processing engine 930 is applied in parallel and/or series to each of the labelled partitions of the energy load data. The temporal processing engine 930 may output a series of aggregated data sets (e.g. m data sets). Each of these data sets may relate to a different time period, e.g. different days of the week or different times of day (if a daily aggregate or average for named days of the week is generated then m=7). Aggregated data sets may be output for each of the plurality of partitions (e.g., for n partitions, n*m aggregated data sets may be output). In a preferred case, the aggregated data sets comprise mean energy consumption values for different time periods within a day, e.g. at an hourly sampling frequency there may be 24 time samples in a day and 7 days in a week, an average is thus computed for each of 168 time points within a week. FIG. 10A shows an example output 1000 of this process for one day. The line 1010 represents a mean value for time points within day "X". The partitioning of the energy load data 905 by the data partitioning engine 920 may improve the accuracy of these aggregated data sets, e.g. a mean consumption may be determined for each day for each partition, whereas if a single partition is used for the data of FIG. 1, this may result in an inaccurate set of mean consumption values for input to the occupancy engine 940.

In a preferred example, the occupancy engine 940 processes the data output by the temporal processing engine 930 to determine an "operational pattern". This processing may be performed separately for each of a set of partitions that is output by the temporal processing engine 930. In this case, the occupancy engine 940 receives data as illustrated in FIG. 10A for each partition and performs a threshold-based processing of this data to output a set of normalised use values. For example, the normalised values may be within a range of 0 to 1. The threshold-based processing may set at least a lower threshold and an upper threshold. For example, FIG. 10A shows an upper threshold 1020 and a lower threshold 1030 that together indicate a determine value range 1040. Energy consumption values above the upper threshold 1020 may be set to 1 and energy consumption values below the lower threshold 1030 may be set to 0, wherein 1 indicates the building is occupied and 0 indicates the building is unoccupied. Processing may be repeated for each of the set of named days within the week.

Figure 10B:
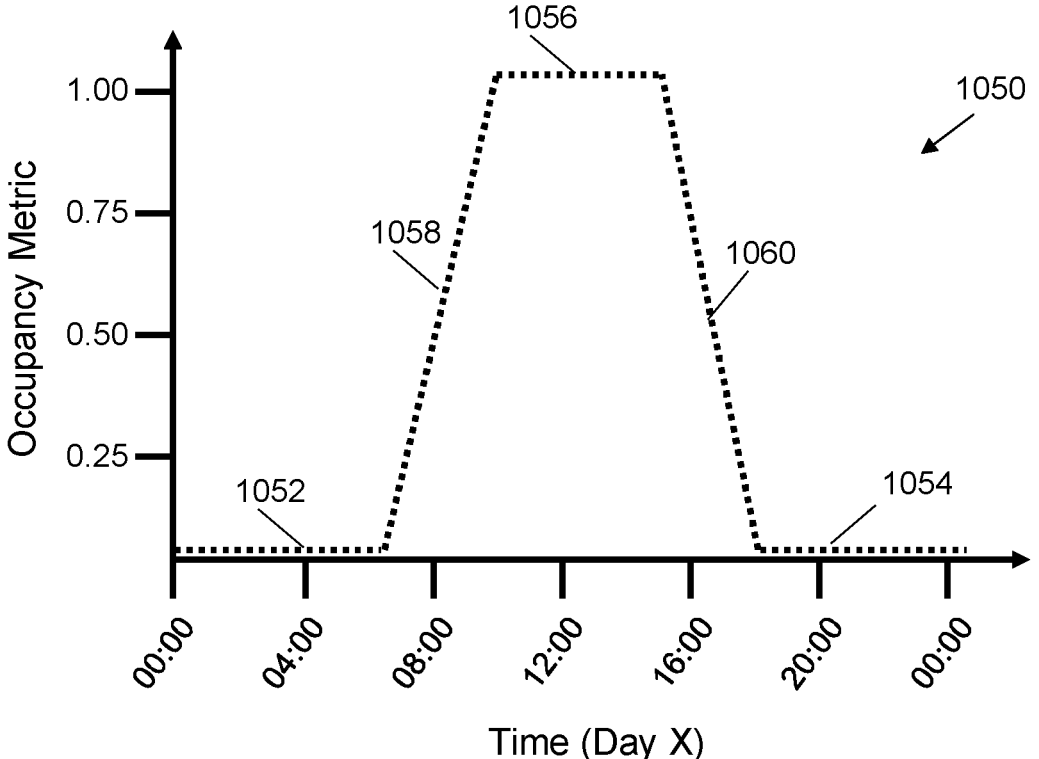

FIG. 10B is a chart 1050 showing an occupancy metric following threshold processing by the occupancy engine 940. Portions 1052 and 1054 correspond to portions of the data 1010 that are below the lower threshold 1030. Portion 1056 corresponds to the portion of the data 1010 that is above the upper threshold 1020. Data 1010 within the determined value range 1040 may be normalised between 0 and 1, as illustrated by portions 1058 and 1060.

One or more of the lower and upper thresholds may be based on predefined percentiles of the energy consumption values (e.g. as output in the aggregated data sets). In one case, the upper threshold may be set as an 85th percentile for the partition (e.g., the 85th percentile across data for the set of 7 days for each partition). In this case, the lower threshold may be set as an adjusted 5th percentile. The adjustment may be based on a range between an upper and lower percentile. For example, the lower threshold may be determined as P5+0.25*(P95-P5) where P5 and P95 are respectively the 5th and 95th percentiles of energy consumption values for each partition. Values between the lower and upper thresholds may then be scaled linearly (e.g., normalised to lie on a range of between 0 and 1 by subtracting the lower threshold and then by dividing by the difference between the upper and lower thresholds). If partitioning is used, and two or more partitions are located, processing is performed per partition (i.e., on a partition-by-partition basis). The result of this threshold-based processing is a set of data for the days of the week for each partition that is scaled from 0 to 1; this is referred to as the "operational pattern".

In some examples, the normalised operational pattern may be used as shown in FIG. 10B. In other cases, a further binary threshold may be applied to the operational pattern data to output values of 0 or 1 indicating unoccupied and occupied respectively. The binary threshold value may be predefined and may vary based on implementation (in certain tests, values within an approximate range of ~0.1 to ~0.3 were used).

To generate a time-series data set for input to the energy estimation systems described herein, the operational patterns for the set of days (e.g. 7 in a week) may be concatenated and then copied and concatenated (e.g. concatenated data for a week may be repeated over time for each partition period). Different partitions may use their respective occupancy patterns. The partition detection thus allows operational patterns for different periods to be accurately determined and used as input data for the energy estimation systems.

In certain cases, operational data for future periods in time may be generated for use as input data for the dilated convolutional neural network architecture. For example, operational data generated based on measured energy load data for a previous year may be applied to a future year, with correspondence between the days of the year. In one case, if partitions are repeatedly located in year-long datasets, e.g. if the shift in FIG. 1 is found for multiple consecutive years, then operational data for a partition that corresponds to the same time of year as the date of the future prediction may be used. For example, if September is in partition 2 for the data of FIG. 1, then a prediction for September of the next year may use occupancy data for the days of the week that is associated with partition 2. In general, windows of a size larger than the receptive field of the input data (e.g., a year's worth of data compared to 3 weeks for each input sample), may be used to determine the occupancy data. In one case, the occupancy data may be generated from one or more years of historical measured energy load data.

Figure 11:
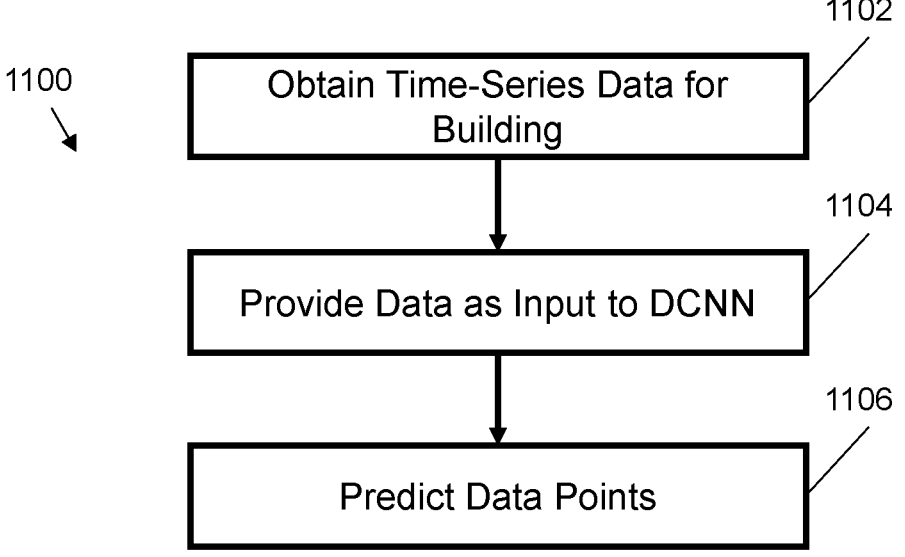
FIG. 11 is a flow diagram showing an example method for estimating the energy consumption of a building.
Figure 12:
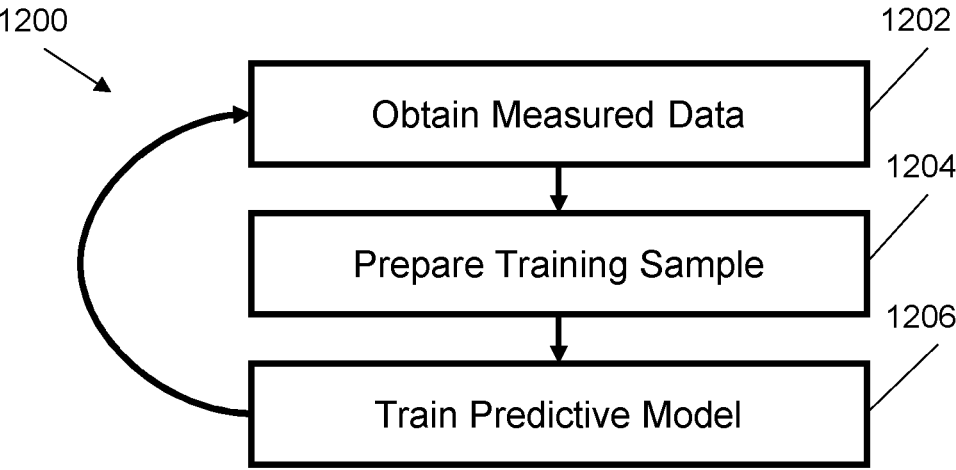
FIG. 12 is a flow diagram showing an example method for training a dilated convolution neural network architecture for use in estimating the energy consumption of a building.
Figure 13:
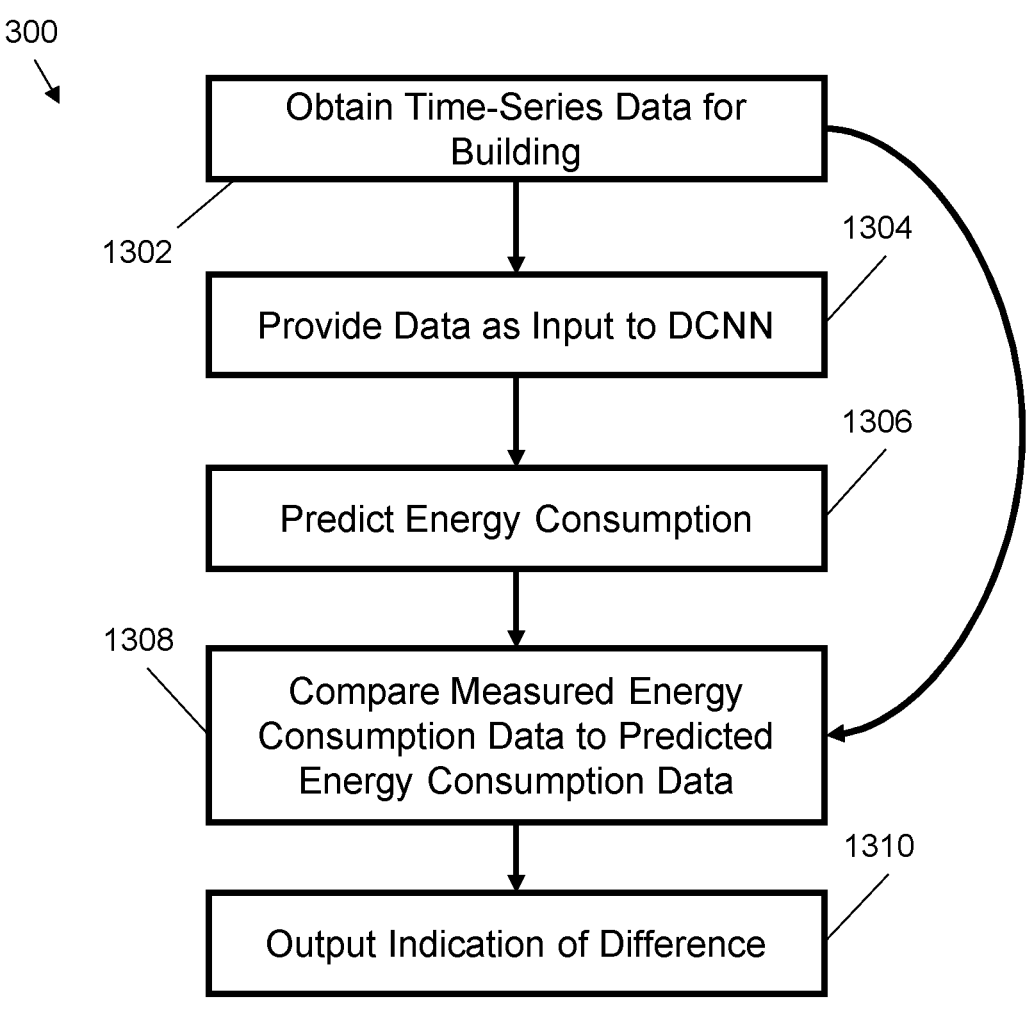
FIG. 13 is a flow diagram showing an example method of comparing measured and predicted energy consumption for a building.

FIGS. 11 to 13 shows a number of methods for estimating an energy use of a building. They may be taken to correspond to the energy estimation systems described above.

FIG. 11 starts at block 1102 where time-series data for the building is obtained. The time-series data may relate to a first time period that is prior to a second time period corresponding to the estimation. The time-series data may comprise one or more of weather data for a location comprising the building and occupancy data for the building. One or more of the data elements within the time-series data may be measured data and/or data computed from measured data, e.g. as obtained from sensors associated with the building. Weather data may comprise one or more of temperature, humidity, wind data and solar irradiance data (amongst others). Occupancy data may be determined as described above and/or obtained from one or more building data sources.

At block 1104, the time-series data is provided as input to a dilated convolutional neural network architecture. The dilated convolutional neural network architecture may be based on one or more of the examples of FIGS. 5 and 6. As described above, a dilated convolutional neural network architecture is parameterised by a set of trained parameters, where the set of trained parameters result from a training operation performed using at least measured time-series data for the building. For example, the measured time-series data may comprise at least measured energy consumption data that is used as ground-truth values for loss function comparisons with predictions.

At block 1106, one or more time-series data points representing an estimated energy consumption for the building are predicted using the dilated convolutional neural network architecture. The one or more time-series data points may correspond to a second time period that follows the first time period discussed above. In certain implementations the second time period may represent a day of predicted data.

In certain variations the occupancy data may be determined using measured energy consumption data for the building as described with reference to FIG. 9. In this case, the method may comprise, prior to (or as part of) either of blocks 1102 and 1104: receiving measured energy consumption data for the building; determining one or more partitions within the energy consumption data using a probabilistic mixture model; segmenting and aggregating the time-series energy consumption data for the building over a set of predefined time periods, wherein the segmenting and aggregating are performed separately for the one or more partitions; normalising the aggregated energy consumption data within a determined value range; and generating operational data in the form of occupancy data for the building from the normalised aggregated energy consumption data for input to the dilated convolutional neural network architecture as part of the time-series data. For example, the occupancy data may be based on repeated data similar to that shown in FIG. 10B.

A corresponding method of training a dilated convolutional neural network architecture for use in estimating the energy consumption of a building may be as follows. In a first block, a training sample for a point in time is received. The training sample comprises input data and a measured energy consumption for the building at the point in time. The input data may comprise the time-series input data 420 or 620 described with reference to FIGS. 4 and 6. The measured energy consumption may comprise a value in kilo-Watt hours as shown in FIG. 1 or FIG. 7. In one case, training data may be generated from at least a year of data samples. In one case, the data samples may comprise one or more weather measurements (e.g., temperature and humidity) and operational data for the building (e.g., an occupancy metric as described above). In this case, a data sample may comprise two or more scalar values, that may be configured as a vector. Each data sample may relate to a particular measurement in time, e.g. for data that is sampled hourly, each day may comprise 24 data samples, whereas for data that is sampled every 15-minutes, each day may comprise 96 data samples. To generate each training sample in the training data, a plurality of consecutive data samples may be combined. For example, each training sample may have a length corresponding to the receptive field of the final dilated convolution layer (e.g., 626 in FIG. 6) of the dilated convolutional neural network architecture. In one test case, at least a year of data samples was found to allow for a suitable set of training data to be generated, wherein training samples within the training data comprise overlapping sets of consecutive data samples. For example, each training sample may comprise a two-dimensional array of size: receptive_field*data_dimensions (e.g., 512*3 for 512 consecutive samples having three data_dimensions representing temperature, humidity and occupancy data, the 512 samples representing approximately 3 weeks of hourly sampled data).

In a second block, the dilated convolutional neural network architecture is trained using the measured energy consumption for the building as a ground-truth value to compare with an output of the dilated convolutional neural network architecture. The training comprising determining values for a set of parameters that characterise the dilated convolutional neural network architecture.

FIG. 12 shows a method that is a variation of the above method of training. At block 1202, measured energy consumption for the building is received. This may be received from a local or remote source, and as a stream or in batches, as discussed above. The measured energy consumption may be received by energy estimation system 250 or 350 of FIGS. 2 and 3. At block 1204, one or more training samples are prepared. These training samples may be as described above and may be prepared in an online or batch manner, including mini-batch training. At block 1206, the dilated convolutional neural network using the one or more training samples as discussed above. In an online training case, training may take place as new energy load data is received by the energy estimation system, e.g. the parameters for the dilated convolutional neural network may be updated when new energy consumption data is received. For example, when a new set of data samples for a day is received, another training sample may be generated including the new data samples and the previous three weeks of data as discussed above. In this sense, training samples are generated based on a rolling update. It shown be noted that the term "online" is used herein in the context of training to refer to "online machine learning" where a model is trained as samples are received in time, and not to refer to training over a network (which may be performed but is not related to training on time-series data). As shown in FIG. 12, blocks 1202 to 1206 may be repeated in an online training configuration, e.g. when new measured energy load data is available for the building. In a test example, training was performed with an Adam optimiser using default parameters apart from use of the AMSGrad variant as described in the paper "On the Convergence of Adam and Beyond" by Sashank J. Reddi et al. (2018).

In certain examples, early stopping may be used during training to prevent overfitting. In this case, training may be stopped when a monitored loss value stops improving. In examples, the loss value may be a difference between the predicted energy consumption values for a building that are output by the dilated convolutional neural network architecture and actual measured energy consumption values for the building, e.g. as received from a smart meter. Early stopping may be applied wherein model weights from a training epoch with the lowest loss value are used. A threshold (such as 0.005) may be set such that only changes in loss above the threshold are measured as a change (e.g. reductions in loss above the threshold are counted as an improvement). Training may be stopped after a certain number of epochs (e.g., 5) have elapsed without improvement in the monitored loss value.

FIG. 13 shows a method 1300 that is a variation of the method of FIG. 12. In FIG. 13, blocks 1302, 1304, and 1306 correspond to blocks 1102, 1104, and 1106 of FIG. 12. The output of blocks 1302 to 1306 may thus comprise predicted data such as that shown by line 830 in FIG. 8. In the example of FIG. 13, block 1302 further comprises receiving measured energy consumption data for the building for times corresponding to the estimated one or more time-series data points, i.e. the data points predicted at block 1306. This may comprise receiving measured energy load data as described with reference to the above examples. The measured energy consumption data for the building may be similar to the data shown as line 820 in FIG. 8.

At block 1308, the method 1300 comprises comparing the measured energy consumption data and the estimated one or more time-series data points. This may comprise determining a difference metric, such as is indicated by arrow 840 in FIG. 8. In certain cases, the difference metric may comprise a distance between two vectors, one of measured energy consumption data and one of predicted energy consumption data (e.g., such as a cosine distance or other distance metrics known in the art). In certain cases, the difference metric may comprise an integral of the area between the two lines 820 and 830 in FIG. 8 for a defined time period (e.g., the period covering the prediction). At block 1310, the method 1300 comprises outputting an indication of any difference between the energy consumption data and the estimated one or more time-series data points. This may comprise comparing the difference metric with a threshold that represents a "significant" difference (which may be a threshold that represents statistical significance). It may additionally, or alternatively, comprise: indicating the area between the two lines on a graphical output on a display device, providing an indication such as arrow 840 for a selected time point, and/or providing an indication of energy saved over the analysed time period based on the difference between the measured and predicted data.

As the dilated convolutional neural network architecture may be quickly trained (either online or offline), questions of energy reduction causality may be asked based on measured energy load data for a building. For example, a time of a modification to a building may be identified and/or entered and a copy of the dilated convolutional neural network architecture may be trained up to that time (e.g., using measured energy load data that precedes the time). This copy of the dilated convolutional neural network architecture may then be used to predict a "future" period following the time of modification as described above. The prediction may then be compared with actual measured data following the time of modification as set out in blocks 1308 and 1310. These copies of the dilated convolutional neural network architecture with trained parameter values may be created on the fly (i.e. temporally) and deleted or discarded following the query. In this manner, building controllers can quickly evaluate the effectiveness of energy reduction options.

Figure 14:
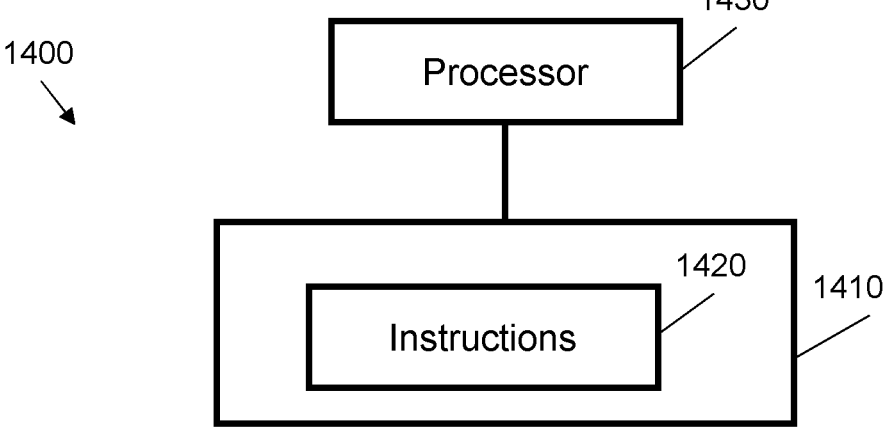
FIG. 14 is a schematic diagram showing a non-transitory computer-readable storage medium that stores instructions to implement certain example methods.

In certain examples, a non-transitory computer-readable storage medium may be provided storing instructions that, when executed by a processor, cause the processor to perform a series of operations. This is shown in the example 1400 of FIG. 14, wherein non-transitory computer-readable storage medium 1410 stores instructions 1420 that are implemented by processor 1430, For example, the energy estimation system described above may comprise a processor that forms part of a computing device and/or may be coupled to one or more memory devices in a similar manner to the measurement processor 230. In one case, the processor and storage medium may form part of a system as described in any one of the previous examples. The storage medium may comprise an EPROM such as 234 or other firmware storage device. The instructions may comprise instructions to implement the methods of any of FIGS. 11, 12 and 13, or any other method described above.

Certain examples described herein provide a machine learning solution to the problem of energy estimation for a building. Comparative physics-based building energy performance simulation requires accurate and comprehensive input data, about the building and its surroundings, whereas the present machine learning solutions require minimal building information for energy use prediction. This makes them more practical for inclusion into a variation of energy evaluation tools for a building and accelerates the development of advanced tools for reducing energy consumption in buildings. Using a dilated convolutional neural network architecture, causal relationships between a building's energy performance and its internal and/or external conditions may modelled by sophisticated mathematical relationships that are learnt from easily available time-series data sets. The solutions described herein have been trained on actual metered energy data of a set of available buildings and so are eminently suitable for integration into advanced smart meters and energy monitoring tools. In tests, the examples provided reasonable and comparable accuracy as required for a wide range of building performance assessment applications. The present examples improve building energy performance predictions and address the shortcomings of comparative conventional approaches.

The above examples are to be understood as illustrative of the invention. Further examples are envisaged. The various "engines" described herein may be implemented using computer program code that is processed by a hardware processor. Computer program code may be written in machine code or one or more programming languages, including, but not limited to C, C++, C #, Python, Java, Fortran, Perl, R, Ruby and Javascript. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A system for estimating an energy use of a building, the system comprising:
   a processor;
   a memory storing instructions that when implemented by the processor implement:
   a dilated convolutional neural network architecture, which is configured to receive time-series data comprising operational data for the building and configured to predict one or more time-series data points representing an estimated energy consumption for the building; and
   an operational data generator configured to receive measured time-series energy consumption data for the building and to generate the operational data for the building, the operational data generator comprising:
      a data partition engine to apply a clustering model to the time-series energy consumption data for the building to determine one or more partitions within the energy consumption data;
      a temporal processing engine to segment and aggregate the time-series energy consumption data for the building over a set of predefined time periods, wherein the temporal processing engine is independently applied to the partitions determined by the data partition engine; and
      an occupancy engine to generate an occupancy metric from the aggregated energy consumption data,
      the occupancy metric being provided as at least part of time-series data for the building to the dilated convolutional neural network architecture.

2. The system according to claim 1, wherein the dilated convolutional neural network architecture is configured to receive time-series data for the building comprising weather data.

3. The system according to claim 2, wherein the weather data comprises one or more of outside temperature, humidity and solar irradiance, the weather data representing local weather conditions for the building.

4. The system according to claim 1, wherein the dilated convolutional neural network architecture comprises:
   an initial dilated convolution layer;

one or more intermediate dilated convolution layers; and a final dilated convolution layer.

5. The system according to claim 4, wherein the dilated convolutional neural network architecture comprises at least one skip connection, wherein the at least one skip connection communicatively couples a location within the dilated convolutional neural network architecture before the one or more intermediate dilated convolution layers and a location within the dilated convolutional neural network architecture after the final dilated convolution layer, and the dilated convolutional neural network architecture comprises a convolution layer that receives data from the at least one skip connection and the final dilated convolution layer.

6. The system according to claim 4, wherein the dilated convolutional neural network architecture further comprises one or more of:

at least one dropout layer; and at least one dense neural network layer before an output of the dilated convolutional neural network architecture.

7. The system according to claim 1, wherein the dilated convolutional neural network architecture is trained online using consecutive sets of time-series data for the building, wherein the time-series data for the building has at least an hourly sampling frequency and the dilated convolutional neural network architecture is configured to output a day of data with each prediction.

8. The system according to claim 1, wherein the dilated convolutional neural network architecture is configured to receive time-series data with a predefined sampling frequency and wherein an output of the dilated convolutional neural network architecture is provided at the same sampling frequency, wherein the time-series data for the building has at least an hourly sampling frequency and the measured time-series data for the building that is used to train the dilated convolutional neural network architecture comprises at least a year of data.

9. A computer-implemented method for estimating an energy use of a building, the method comprising:

obtaining time-series data for the building;

providing the time-series data as input to a dilated convolutional neural network architecture, the dilated convolutional neural network architecture being implemented by instructions stored in memory that are implemented by a processor; and predicting one or more time-series data points representing an estimated energy consumption for the building using the dilated convolutional neural network architecture, wherein the method further comprises an operational data generator, which is implemented by instructions stored in memory that are implemented by a processor:

receiving measured energy consumption data for the building;

determining one or more partitions within the energy consumption data using a probabilistic mixture model;

segmenting and aggregating the time-series energy consumption data for the building over a set of predefined time periods, wherein the segmenting and aggregating are performed separately for the one or more partitions;

normalising the aggregated energy consumption data within a determined value range; and generating operational data in the form of occupancy data for the building from the normalised aggregated energy consumption data for input to the dilated convolutional neural network architecture as part of the time-series data.

10. The method according to claim 9, wherein the time-series data relates to a first time period that precedes a second time period corresponding to the one or more time-series data points and the time-series data comprises:

weather data representative of a location comprising the building.

11. The method according to claim 9, wherein the dilated convolutional neural network architecture comprises:

an initial dilated convolution layer;

a set of one or more intermediate dilated convolution layers; and a final dilated convolution layer.

12. The method according to claim 11, wherein the dilated convolutional neural network architecture further comprises:

at least one skip connection between an output of the initial dilated convolution layer and an output of the final dilated convolution layer;

a convolution layer that receives data from the at least one skip connection and the final dilated convolution layer;

at least one drop-out layer; and at least one dense neural network layer before an output of the dilated convolutional neural network architecture.

13. The method according to claim 9, wherein the dilated convolutional neural network architecture is configured to receive time-series data within a predefined sampling frequency, the predefined sampling frequency being at least hourly, and wherein an output of the convolutional neural network architecture comprises a plurality of data points at the same sampling frequency.

14. The method according to claim 9, comprising:

receiving measured energy consumption data for the building for times corresponding to the estimated one or more time-series data points;

comparing the measured energy consumption data and the estimated one or more time-series data points; and outputting an indication of any difference between the energy consumption data and the estimated one or more time-series data points.

15. A computer-implemented method of training a dilated convolutional neural network architecture for use in estimating the energy consumption of a building, the dilated convolutional neural network architecture being implemented by instructions stored in memory that are implemented by a processor, the method comprising:

receiving a training sample for a point in time, the training sample comprising input data and a measured energy consumption for the building at the point in time; and training the dilated convolutional neural network architecture using the measured energy consumption for the building as a ground-truth value to compare with an output of the dilated convolutional neural network architecture, the training comprising determining values for a set of parameters that characterise the dilated convolutional neural network architecture;

wherein the method further comprises:

determining one or more partitions within the measured energy consumption data using a probabilistic mixture model;

segmenting and aggregating the energy consumption data for the building over a set of predefined time periods, wherein the segmenting and aggregating are performed separately for the one or more partitions;

normalising the aggregated energy consumption data within a determined value range;

generating operational data in the form of occupancy data for the building from the normalised aggregated energy consumption data; and using the occupancy data to generate the training sample for input to the dilated convolutional neural network architecture.

* * * * *